United States Patent [19]

Smith, III et al.

[11] Patent Number: 4,500,879

[45] Date of Patent: Feb. 19, 1985

[54] CIRCUITRY FOR CONTROLLING A CRT BEAM

[75] Inventors: Jay Smith, III, Pacific Palisades; Gerald S. Karr, Venice, both of Calif.

[73] Assignee: Smith Engineering, Culver City, Calif.

[21] Appl. No.: 337,332

[22] Filed: Jan. 6, 1982

[51] Int. Cl.[3] .......................... G06F 3/14; H01J 29/70

[52] U.S. Cl. .................................... 340/739; 273/1 E; 273/DIG. 28

[58] Field of Search ................. 273/1 E, 1 GC, 85 G, 273/DIG. 28; 340/701-705, 709, 711, 723-725, 727, 739, 807, 323 R

[56] References Cited

U.S. PATENT DOCUMENTS

| | | | |
|---|---|---|---|
| 3,394,367 | 7/1965 | Dye | 340/739 |
| 3,582,705 | 6/1971 | Waller | 315/18 |
| 3,659,284 | 4/1972 | Rusch | 340/324 A |
| 3,659,285 | 4/1972 | Baer et al. | 340/324 A |
| 3,718,834 | 2/1973 | Bacon et al. | 315/18 |
| 3,723,803 | 3/1973 | Harrison et al. | 315/22 |
| 3,725,563 | 4/1973 | Woycechowsky | 235/186 |
| 3,728,480 | 4/1973 | Baer | 273/DIG. 28 |
| 3,728,575 | 4/1973 | Granberg et al. | 315/18 |
| 3,747,087 | 7/1973 | Harrison et al. | 340/324 AD |
| 3,767,901 | 10/1973 | Black et al. | 340/324 R |
| 3,778,058 | 12/1973 | Rausch | 273/1 E |
| 3,778,810 | 12/1973 | Hayashi | 340/324 AD |
| 3,793,483 | 2/1974 | Bushnell | 340/324 AD |
| 3,809,395 | 5/1974 | Allison, Jr. et al. | 273/1 E |
| 3,829,095 | 8/1974 | Baer | 273/DIG. 28 |
| 3,869,085 | 3/1975 | Green | 235/198 |
| 3,874,669 | 4/1975 | Ariano et al. | 273/85 G |
| 3,891,982 | 6/1975 | Cheek et al. | 340/324 AD |
| 3,911,419 | 10/1975 | Bates et al. | 340/324 AD |
| 3,913,089 | 10/1975 | Albrecht | 340/324 AD |
| 3,921,161 | 11/1975 | Baer | 273/DIG. 28 |
| 3,925,765 | 12/1975 | Berwin et al. | 340/324 AD |
| 3,976,982 | 8/1976 | Eiselen | 340/172.5 |
| 3,996,673 | 12/1976 | Vorst et al. | 235/151 |
| 4,006,474 | 2/1977 | Lukkarila | 273/DIG. 28 |
| 4,006,898 | 2/1977 | Great et al. | 273/85 R |
| 4,015,846 | 4/1977 | Runte et al. | 340/324 AD |
| 4,016,362 | 4/1977 | Bristow et al. | 358/142 |
| 4,027,148 | 5/1977 | Rosenthal | 340/324 A |
| 4,027,403 | 6/1977 | Marsh | 358/93 |
| 4,034,983 | 7/1977 | Dash et al. | 273/85 G |
| 4,034,990 | 7/1977 | Baer | 273/85 R |
| 4,053,740 | 10/1977 | Rosenthal | 364/705 |
| 4,054,919 | 10/1977 | Alcorn | 358/148 |
| 4,068,847 | 1/1978 | Lukkarila et al. | 273/DIG. 28 |
| 4,070,710 | 1/1978 | Sukonick et al. | 364/900 |
| 4,111,421 | 9/1978 | Mierzwinski | 273/85 G |
| 4,149,027 | 4/1979 | Asher et al. | 174/52 R |
| 4,162,492 | 7/1979 | Jones, Jr. | 340/723 |
| 4,185,825 | 1/1980 | Bromley | 273/DIG. 28 |
| 4,194,198 | 3/1980 | Baer et al. | 273/85 G |
| 4,301,503 | 11/1981 | Frederiksen | 364/200 |

*Primary Examiner*—Richard C. Pinkham
*Assistant Examiner*—Mary Ann Stoll
*Attorney, Agent, or Firm*—Jackson, Jones & Price

[57] ABSTRACT

A CRT beam control apparatus wherein a microprocessor drives the CRT beam for controlling the beam characteristics, including writing speed, slope, position and intensity. The apparatus includes a single digital-to-analog converter supplying sample-and-hold circuitry through a selector and further includes a pair of active integrator circuits switchable to connect the output of the digital-to-analog converter or sample-and-hold circuits. The microprocessor is operative to provide digital words to the DAC representative of the differential X and Y values of a line segment to be drawn. The analog representations of these digital words are coupled to the integrators. The outputs of the active integrators provide the deflection signals causing deflection of the CRT beam. The apparatus is particularly adapted to drawing a series of connected line segments, due to the integrator operation. A line segment length may be scaled simply by varying the time interval that the analog signals are applied to the integrators, while the writing speed remains constant. The apparatus is also adaptive to display a pseudo-raster scan field.

2 Claims, 14 Drawing Figures

CIRCUITRY FOR CONTROLLING A CRT BEAM

FIELD OF THE INVENTION

The present invention relates to the field of cathode ray tube video displays, and more particularly to apparatus employing the vector scan format. The invention relates to the apparatus and method described in the co-pending application Ser. No. 337,215, and entitled "Self-Contained Arcade Game Apparatus And Method For Object Generation," assigned to the same assignee as the present invention.

BACKGROUND AND SUMMARY OF THE INVENTION

Perhaps the most common video display device in use today is the cathode-ray tube ("CRT"), the most common application, of course, being the household television. In recent years, the use of CRTs has been expanded to include the display of computer processed information, data recording, scan conversion, projection devices, and a myriad of other applications, including video arcade games.

The majority of cathode-ray tubes are of conventional design, differing only in size and shape of envelope, and type of electron gun. The basic and most common CRT includes a glass faceplate (or screen), which is the viewed portion of the device, with a conically shaped envelope attached to the back of the faceplate. At the small (rearmost or neck) end of the envelope is located an electron gun, which inclues a heated wire (or filament) which is capable of emitting electrons by thermionic emission. The inside of the facepate is coated with a thin layer of material which phosphoresces (emits light) when struck by energetic electrons emitted by the electron gun. The inside of the envelope is evacuated to a hard vacuum to allow the free passage of electrons from the gun to the faceplate.

The function of the electron gun is to form the electrons emitted by the filament (or cathode), into a tight beam only a few thousandths of an inch in diameter. The gun accomplishes this by way of an array of focusing grids and rings. The electrons are then accelerated toward the faceplate by means of an electric field caused by applying high voltage to a metallized coating deposited on the inside of the envelope, near the front (faceplate) of the tube. The voltage required varies from a minimum 700 to 1000 volts to as much as 80,000 volts, depending on the size of the tube, and the brightness required of the display.

The parts of a cathode-ray tube described above are capable, by themselves, of illuminating a tiny spot on the face of the CRT. In order to create a useful display, a means of directing or aiming the electron beam at specific points on the screen is added. One common method of altering the motion of electrons is by a magnetic field. In an electromagnetically deflected tube, the beam is deflected by magnetic fields caused by passing current through relatively high inductance yoke coils, usually placed around the outside of the neck of the tube. Although this method can be made to operate from low voltage power supplies, the currents required by the yoke coils increase the amount of power required by the system. The inductance of the yoke coils also places an upper limit on the frequencies which can be used to drive them. The electromagnetically deflected tube offers the advantages of good focus and can be driven by low voltage deflection circuitry. The preferred embodiment of the present invention utilizes an electromagnetic deflection system, but is readily adaptable to other deflection systems as well, e.g. electrostatic deflection systems.

CRTs are driven by different display formats. A "raster scan" display is created by rapidly sweeping electron beam horizontally across the face of the CRT, while simultaneously sweeping the beam vertically at a slower rate of speed, the arrangement used for television broadcasting. As the beam is swept, the electron beam current is modulated by the picture (video) information which causes the phosphor at different areas on the CRT face to glow at contrasting brightness levels, thus, "painting" the image on the face of the tube.

In the case of television, the horizontal scan rate is approximately 15,750 Hertz, and the vertical rate is 60 Hz. During each 1/60th of a second vertical sweep period, one frame of 262.5 lines is drawn on the screen. The scan lines of alternate frames are interlaced, thus producing a display with 525 lines of vertical resolution, 30 times per second. At this rate of speed, the human eye does not perceive a significant flicker.

Computer generated, raster scanned video displays are usually created by representing each displayed point on the screen by one bit in a computer's main memory. This type of display generation is termed "memory mapped." Since the memory requirements to display an image of the desired resolution is fixed, the amount of memory consumed by the display is the same, regardless of the complexity of the image. The data stored in the area of memory set aside for the display is read out by appropriate circuitry and used to drive the display directly. The data is read from memory, in synchrony with the electron beam scanning of the CRT. The electron beam current in the CRT is turned on or off by the presence or lack of a "true" bit at each appropriate location of the display memory, causing the appropriate points on the face of the tube to be light or dark. In order to change the displayed image, the undesired, existing points are erased, and the new desired points are added to the displayed image in memory. The requirement for erasing the existing points on the screen is a decided disadvantage to the memory mapped raster scanned video display generation method for the creation of complex or dynamically changing shapes.

Most computer displays are of the raster scan type; however, these displays are, for the most part, used for displaying of character images. Character images can be stored in low-cost read-only memory, and if these prestored alphanumeric characters are the only images to be displayed, the memory and processing requirements for the display can be considerably reduced. For example, this type of principle is used in one commercial apparatus in use today, the "Video Computer System", manufactured by Atari, Inc. which adapts a home television receiver to play arcade video games. A primary disadvantage of this application of the raster scan format is that the video refresh requirements are such that, when only one CPU is employed, the only available CPU time for performing game logic functions is during the vertical retrace of the CRT beam. During the horizontal scanning, the CPU is employed in refreshing the video display. The limited CPU time for game logic calculation is a significant restriction on the complexity of the games. Displays which require very high resolution, or compatibility with home television devices are also, for various reasons, implemented with raster scan video generation techniques.

A vector CRT display is entirely different from a raster scan display in that the motion of the electron beam is directly controlled by the associated electronics. In the raster scan display, only the intensity of the beam (brightness) is controlled, while the motion of the beam repeatedly traces a fixed raster pattern on the face of the tube. A vector display has direct control over the left/right and up/down motions of the beam, as well as the brightness of the beam at each point.

In a vector display system, objects are represented on the screen by a sequence of line segments, each of any length or orientation. Each line segment is defined in the display's refresh memory by its endpoints only. The X-Y coordinates of the starting point of a line segment, and the X-Y coordinates of the ending point can be specified in only four words of the memory. The intervening "points" are filled in automatically by the vector generation electronics. Furthermore, most objects are drawn with sequences of connected line segments which allow the endpoint of each line segment to double as the starting point of another line segment, thus, saving still more memory. For example, a closed quadrilateral of any shape, orientation, or dimension may be drawn with only 10 words of data.

The vector display method, then, is ideally suited to the drawing of figures and other graphic displays. The raster scan system is more suited to the display of pictures and other solid, or "colored-in" scenes. A vector display is more efficient at using available system resources in that less processing time is required for the computer to create and move shapes, less memory is required to represent those shapes, and less power is consumed by the CRT driving electronics.

Scaling, translation, or rotation of an object is also, much more easily accomplished in a vector display system, in accordance with the present invention, than in a raster system. For example, to take a line which is 100 points long and move it diagonally in a raster system requires that each of the 100 points be individually decoded from memory, translated to their appropriate destinations, written into memory, and erased from their old locations. This requires thousands of computer instructions. In contrast, moving the same line on a vector display device requires the translation of either 2 or 4 bytes of data (depending on the type of motion required), yielding an efficiency improvement of approximately 100 to 1. No erasure of old data is required, only modification of existing refresh data.

One purpose to which CRTs have been put as display devices is that of arcade video games. There has been in recent years a boom in the popularity of these games, resulting from the advent of microprocessors and microcomputers. These arcade games have developed from the relatively simple black and white video "Pong" games of a few years ago to the sophisticated games available today utilizing color displays and realistic sound effects, and capable of displaying numerous objects in a highly complex field pattern. A major drawback of these sophisticated systems is, as might be expected, their cost as well as their relatively large size. The self-contained video arcade apparatus of today cost in the thousands of dollars, and are large freestanding pieces of equipment generally adapted to a professional arcade use.

Apparatus have been developed to simulate the arcade game experience in the home by utilizing apparatus which relies on the home television receiver as the display means. As mentioned above, such apparatus is manufactured by Atari (the "Atari Video Computer") and, as well as other companies, e.g., Mattel, Inc. (the "Intellevision" game) and Magnavox (the "Oddessy System"). Apparatus which relies on the home television receiver must be equipped to generate signals compatible with the receiver, i.e., RF frequency carrier signals modulated in the same manner as broadcast signals to allow demodulation and display by the relatively high resolution raster scan display process of the cathode-ray tube receiver. The added cost and complexities of circuitry for modulating the data signal to RF frequencies is a considerable drawback to such systems. Yet another drawback to the home system which utilizes a television receiver as the display device is the fact that the game apparatus must be adapted to generate its display using the raster scan technique employed in the standard television receiver. This technique may be well suited to the television receiver application, since it is capable of relatively high resolution display required for acceptable reproductions of motion picture, live events or other works recorded by photographic or video methods.

Certain professional grade arcade video games utilize a vector display format instead of the raster scan format. Typical of the publications in this art are U.S. Pat. Nos. 4,027,148 (for a vector generator) and 4,053,740 (for a video game system), both issued to Lawrence T. Rosenthal. The video system and vector generation techniques described in these publications are believed to be used in present day professional quality video arcade games, and are adapted to generate separate line segments which, when viewed as a composite, appear as recognizable animated objects. Yet the Rosethal disclosures still fall considerably short of providing a system which takes full advantage of the advantages of the vector scan format. For example, Rosenthal's technique of drawing individual line segments fails to recognize that arcade games may be viewed as object oriented, and not simply as an accumulation of line segments. The Rosenthal system is unable to provide efficient control of the intensity of individual line segments, to efficiently scale object size, and, moreover, is oriented to a professional, expensive grade of equipment.

The Rosenthal vector generation system suffers several disadvantages. A principle disadvantage is that the system employs a separate digital-to-analog converter ("DAC") for the X coordinate and Y coordinate components of the vectors. DACs are relatively expensive circuit components, and moreover can require adjustments to compensate for shifts in component values due to aging, etc. Such adjustments required costly service calls by trained technicians. Failure to maintain proper alignment will shift line segments and affect the quality of display, as line segments defining an object may fail to connect, due misalignment offsets. The Rosenthal vector generation system suffers the disadvantage that absolute drawing voltages for each line segment are generated; the system does not efficiently use differential voltage levels to draw differential line segments, or to efficiently utilize voltage levels generated to draw the preceeding vector.

These and other shortcomings of the prior art known to applicant have been resolved by the preferred embodiment disclosed herein, which includes a self-contained video display and game apparatus, adapted for the display of objects consisting of connected line segments. A dedicated CRT is controlled by a microprocessor unit which is adapted, with associated peripheral circuitry, to convert digital representations of objects into a series of connected line segments drawn by the CRT. The digital representation includes sets of data defining the line segments representing the object. The controller is adapted to determine the position of the object to be drawn, to draw a (blanked) line segment from the origin or center of the CRT to that location, and to draw the series of predetermined, connected line segments which comprise the object. The apparatus is further capable of varying the intensity of each line segment from zero to the maximum intensity and to vary the size of a displayed object by changing the writing time of each line segment.

The apparatus is provided with means for receiving an external ROM cartridge, storing additional game and object information. The system is also readily adaptable to color CRT displays.

The CRT beam control apparatus of the preferred embodiment includes a single digital-to-analog converter, three sample-and-hold circuits, and a pair of active integrator circuits. A microprocessor is adapted to control these circuit components and to cause digital representations of the differential X and Y components of line segments and the intensity level to be loaded into the DAC. A data multiplexer selectively applies the DAC output to one of the preselected sample-and-hold circuit means.

In the preferred embodiment, the microprocessor is operative to provide a digital word to the DAC representative of the differential X component of the line segment to be drawn. The data multiplexer applies the analog signal output of the DAC to a first sample-and-hold circuit. A digital word representative of the intensity level is also applied to the DACs and the analog output applied to a second sample-and-hold circuit. A digital word representative of the differential Y component of the line segment to be drawn is loaded into the DAC and the analog signal coupled directly to one of two integrator circuits (the X integrator) via a first switch means. The output of the first sample-and-hold circuit is coupled to the X integrator circuit via second switch means. The control gates of the first and second switches are ganged together.

After the DAC has converted the X and Y differential component values, the two switch means are closed for a predetermined interval, applying the X and Y analog voltage signals to the respective X and Y integrators. The integrator is operative in the conventional manner to integrate the applied voltage over time. Hence, with a constant voltage input, the integrator output will linearly change with time, over the interval during which the switches remain closed. The integrator outputs are applied to X and Y deflection circuitry means and comprise the drawing signals which operate to deflect the electron beam to draw a line segment.

The integrators are operative to selectively hold the voltage level at the end of a first drawing interval so that application of successive X and Y differential voltages is added to (or subtracted from) the initial output level of the integrator. These features provide a significant advantage, allowing a plurality of connected line segments to be drawn from differential signal levels, rather than from absolute signal levels referenced from a particular origin location. Means are provided for selectively zeroing the integrators.

Yet another feature of the present invention is the multiple use of the single DAC. The DAC is used to convert data representative of the preselected intensity level.

The problem of DAC adjustment is substantially overcome by use of the DAC "00" output as the virtual ground provided to the differential amplifiers which drive the X and Y integrators. By periodically setting the DAC to the 00 level and selectively applying that DAC output to the third sample-and-hold circuit and then to the "plus" input of each differential amplifier, the integrators will shift with any changes in the DAC. This compensation technique substantially eliminates the need for periodic maintenance of the DAC.

The disclosed apparatus has an ability to control a wide range of the characteristics of a CRT not heretofore available in a relatively low cost system. The degree of control over the beam allows the use of the CRT not only in a vector scan format, but also in a pseudo-raster scan format.

Other features and advantages of the preferred embodiment are described hereinafter.

DETAILED DESCRIPTION OF THE PREFERRED EMBODIMENT

The preferred embodiment of the present invention comprises a novel self-contained arcade game and video display apparatus. The following description is provided to enable any person skilled in the art to make and use the invention. Various modifications to the preferred embodiments will be readily apparent to those skilled in the art, and the generic principles defined herein may be applied to other embodiments. Thus, the invention is not intended to be limited to the embodiments shown, but is to be accorded the widest scope consistent with the principles and novel features disclosed herein.

Figure 1:
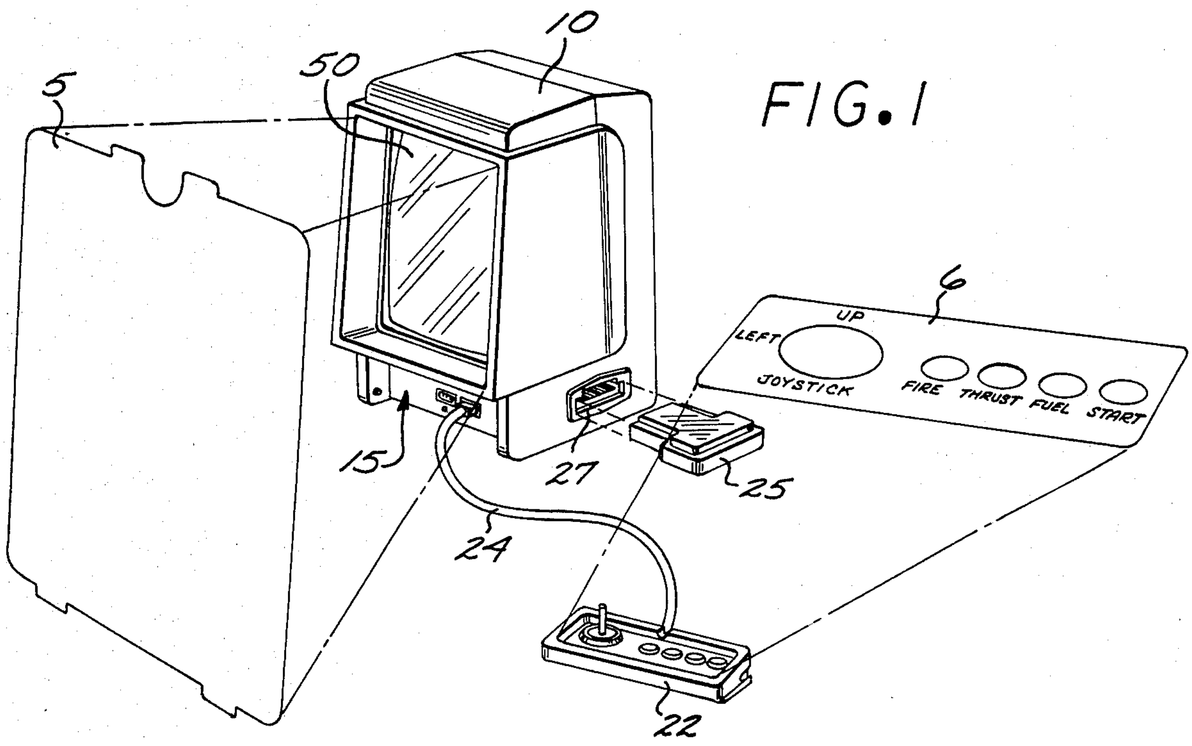
FIG. 1 is a perspective view illustrating the physical appearance and layout of the preferred embodiment.

Referring now to FIG. 1, a perspective view illustrating the physical appearance of a preferred embodiment of the invention is shown. The CRT 50 and associated circuitry is contained in housing 10, a space efficient member adapted for some portability. In the preferred embodiment, a CRT screen measuring approximately 10 inches diagonally (approximately 9 inch viewing area, measured diagonally) is selected to provide sufficient screen area for viewing by two players, yet still be small enough so that the unit may be easily carried by one person. Hand control unit 20 is provided and its housing 22 shaped so that unit 20 may be fitted into recess 15 formed in housing 10 in a storage position, e.g., when the unit is not in use. The controller is electrically connected to the circuitry contained within housing 10 by electrical umbilical 24, which couples to electrical connector 170.

Figure 2:
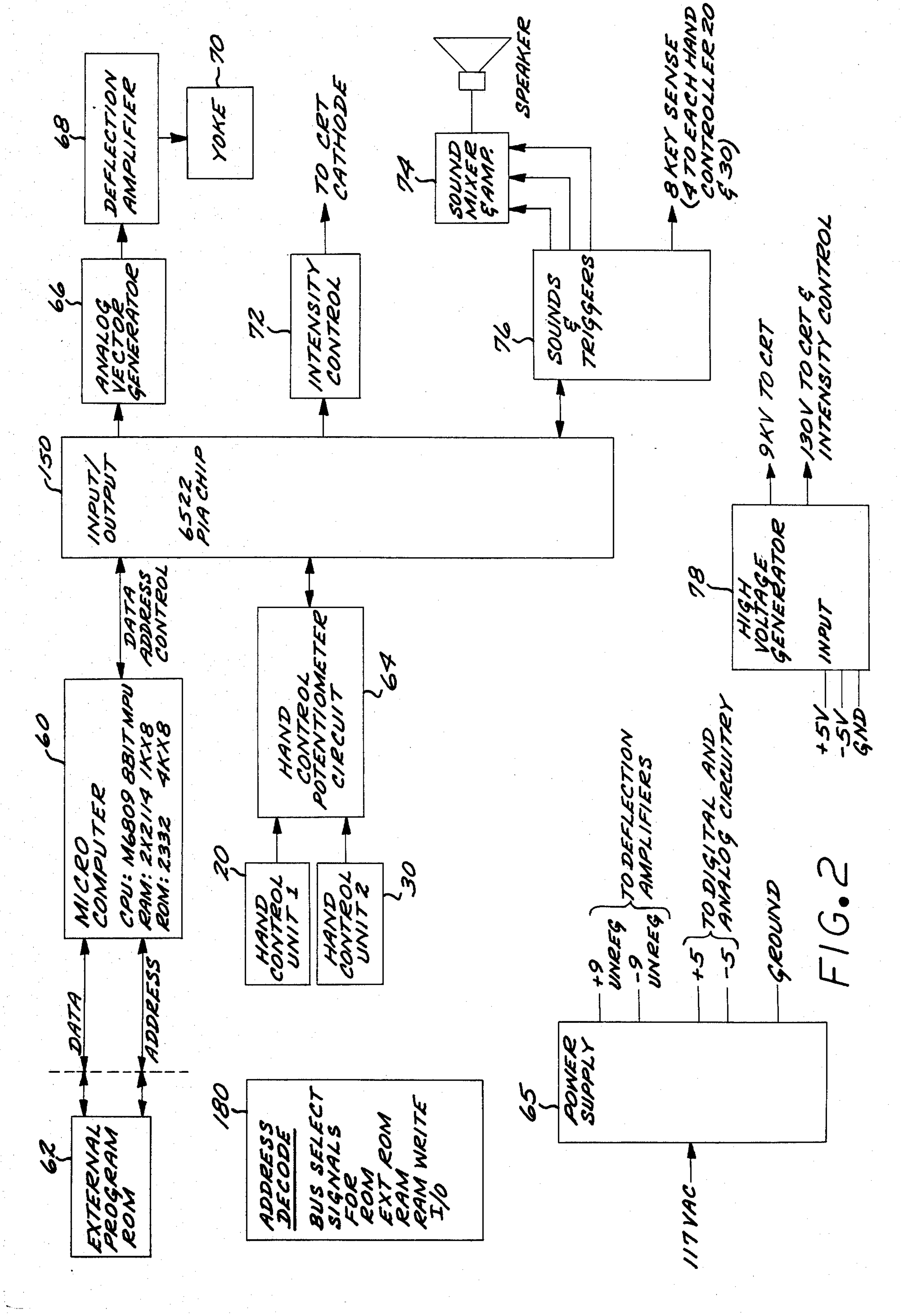
FIG. 2 is a block diagram of the electrical circuitry of the preferred embodiment.

Referring now to FIG. 2, a block diagram of the electrical system is shown, providing an overview of the components of the system. The heart of the digital processing unit is the microcomputer 60, consisting of a microprocessor (MPU) with random access and read only memories. An external program ROM 62 is made available to provide optional game playing capabilities. A peripheral interface adapter chip 150 is used to interface with the analog vector generator 66 and associated deflection amplifier 68, CRT intensity control 72, complex sound generator chip 76, sound mixer and audio amplifier 74 and hand controller potentiometer reading circuit 64. Power supply circuit 65 and high voltage generator 78 are provided. An address-decode circuit is provided to allow the MPU to properly interface with the other digital elements of the circuit.

In its preferred embodiment, the present invention will be adapted to the play of arcade-type video displays. Thus, the video display is adapted to generate active displays of moving game objects and background fields. The operator may interact with the apparatus via hand controller units which include a joystick control having X and Y position indicating potentiometers and four switches. The apparatus is adapted to develop the video display through a novel technique, whereby each "object" (or "vector packet") is defined as a plurality of interconnected line segments. This powerful vector generation technique allows for considerable simplification in MPU processing and analog circuitry.

A primary purpose of the present invention is to provide a high quality video display and arcade game apparatus at a very low cost. An object of the present invention providing an apparatus which would be of relatively low cost, and yet provide an exciting visual display. The apparatus outlined in FIGS. 1 and 2, and described in more detail hereafter, achieves these goals, and provides to the operator an arcade game experience.

Before describing further the overall function of the system, the circuitry of the preferred embodiment will be described. Referring now to FIG. 3, a schematic drawing is shown, illustrating the digital computing section. A primary computing element is microprocessor ("MPU") 110, which in the preferred embodiment is a Motorola Inc. MC 6809 type unit. The properties and specifications of the microprocessor are described in the Motorola Microcomputer data sheet distributed by Motorola, Inc. The contents of the description are incorporated herein by reference. In view of this description of the microprocessor, its function and properties need not be described in detail.

Figure 3A:
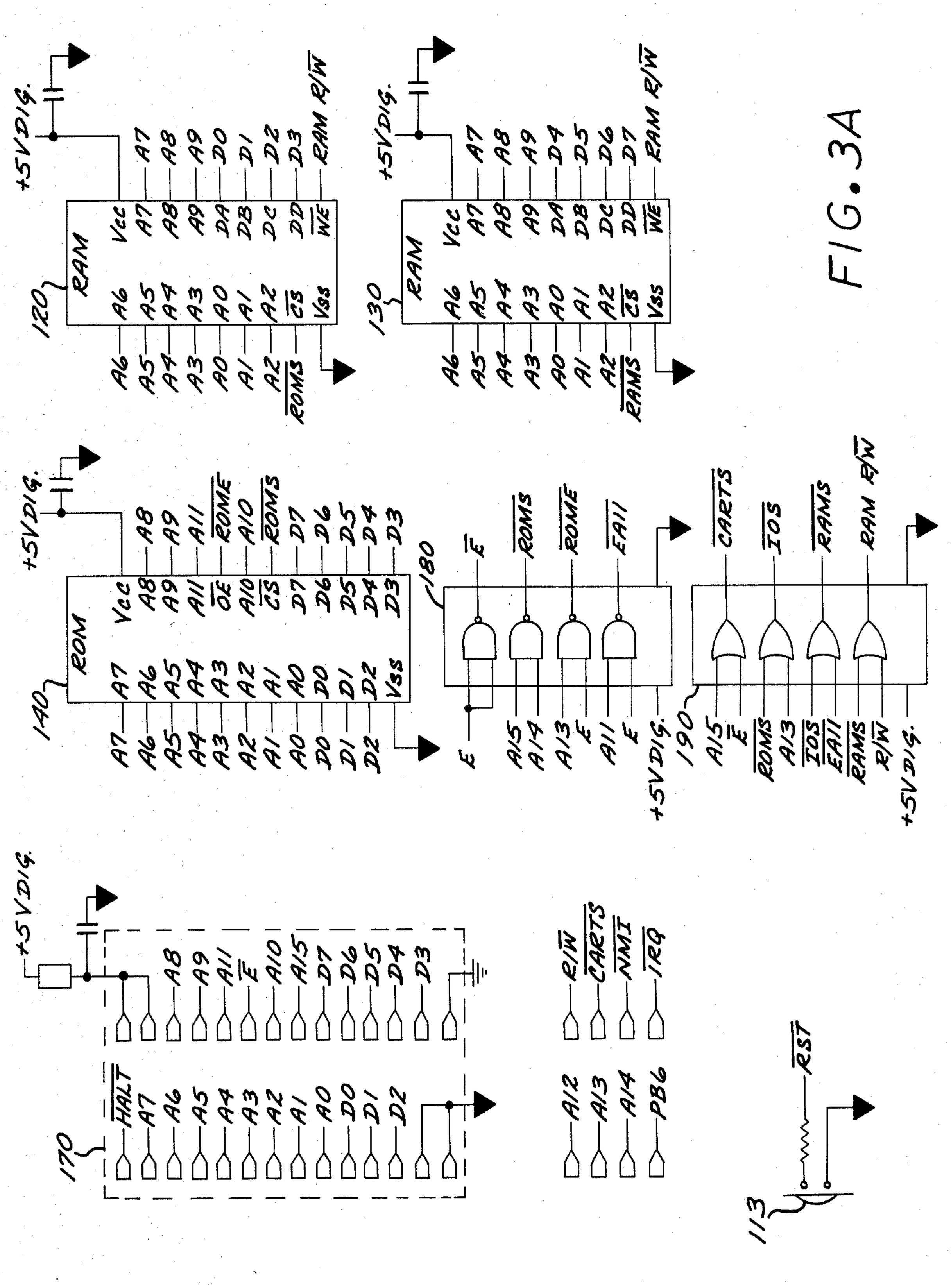
FIGS. 3A and 3B are schematic drawings illustrating the primary digital circuitry of the preferred embodiment.
Figure 3B:
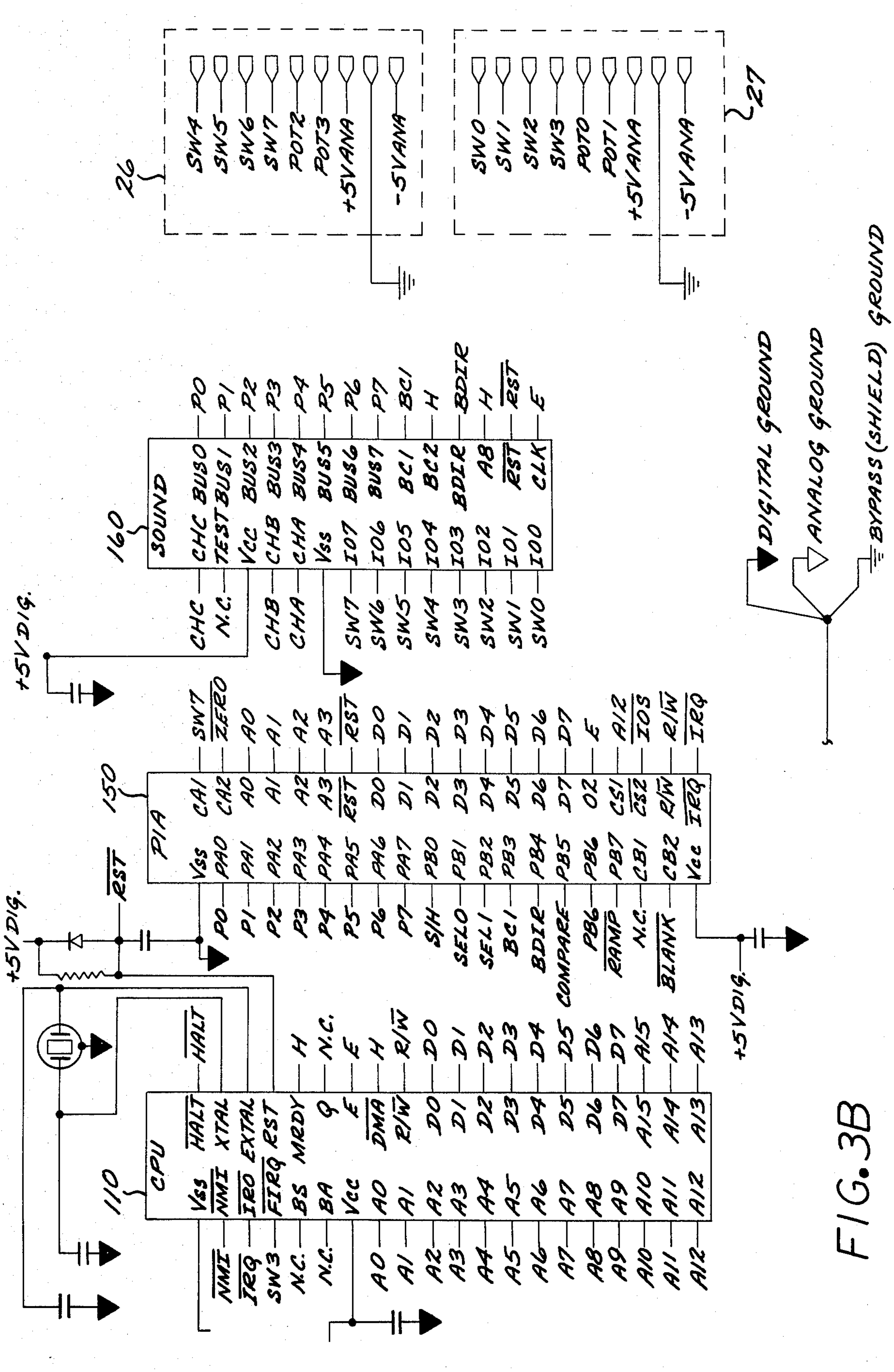

In FIGS. 3A and 3B, the connections of the terminals of the various devices are identified with alphanumerics. In some instances, of course, a terminal may be connected to more than one terminal or connection point, and the same alphanumeric is used at each connection.

Two 4K-bit random access memories (RAMs) 120 and 130 are provided, each having its respective address ports (terminals A0–A9) and data ports (terminals D0–D7) coupled through address and data busses (not shown) to corresponding address and data ports of microprocessor 110. RAMs 120 and 130 provide storage locations needed by the microprocessor 110 during operation, e.g. to store data indicative of the locations of objects, game status and various other types of information. In the preferred embodiment, Intel 2114A units are used.

Read only memory (ROM) 140 is provided (4K×8 bit), and also has the terminals A0–A11 of its address port and terminals D0–D7 of its data port coupled through address and data busses (not shown) to corresponding address and data ports of microprocessor 110. ROM 140 serves as the "on-board" program memory, and provides a stored program with particular object definitions. In the preferred embodiment, a No. 2332 ROM is used. ROM 140 includes common subroutines and "executive" instructions. It is contemplated that the apparatus will function with at least one game, using the information stored in the on-board ROM 140, yet an external ROM will be provided on a plug-in cartridge to provide additional game information.

Peripheral interface adaptor (PIA) 150 is provided, and is used as a means of interfacing the peripheral devices and external signals with MPU 110. The connections of the terminals of PIA 150 will be described in more detail hereinbelow as the various peripheral equipment is described and discussed. The characteristics and function of the device, a 6522 unit, as described in the Commodore Semiconductor Group data sheet, the contents of which are incorporated herein by reference.

Complex sound generator chip 160 is used to provide the sound effects for the system, and to read the hand controller switches SW0–SW7. Terminals I00–I07 are connected respectively to switches SW0–SW7, four each located on the hand controller units 20 and 30. Terminals P0–P7 are connected respectively to terminals PA0–PA7 of PIA 150. The PIA 150 provides input and output data to the programmable sound generator chip 160 for switch reading and sound generation.

Also shown in FIG. 3 is the terminal allocation for 36 pin cartridge connector 170. Connector 170 provides the electrical connection between MPU 110 and the external ROM 62 disposed in a removable cartridge member which may optionally be used to provide a program memory means alternative to or in addition to ROM 140.

Connectors 26 and 27 are provided to couple the electrical umbilical 24 to the computing section.

Address-decode chip 180 is used as a means to select the appropriate circuit element to be addressed by the MPU 110 at a particular instant of time. Terminals A11 and A13–A15 of MPU 110 are used as the selection bits for address-decode chips 180 and 190, which operate on these bits in the manner shown (i.e., by NAND or OR operations) to select, e.g., RAM 120, RAM 130, ROM 140, or external ROM 62. For example, signals $\overline{ROMS}$ and $\overline{ROME}$ is used to select and enable ROM 140. Hence, address-decode chips 180 and 190 act as a multiplexing device to allow the MPU 110 to properly interface with more than one device.

Figure 4:
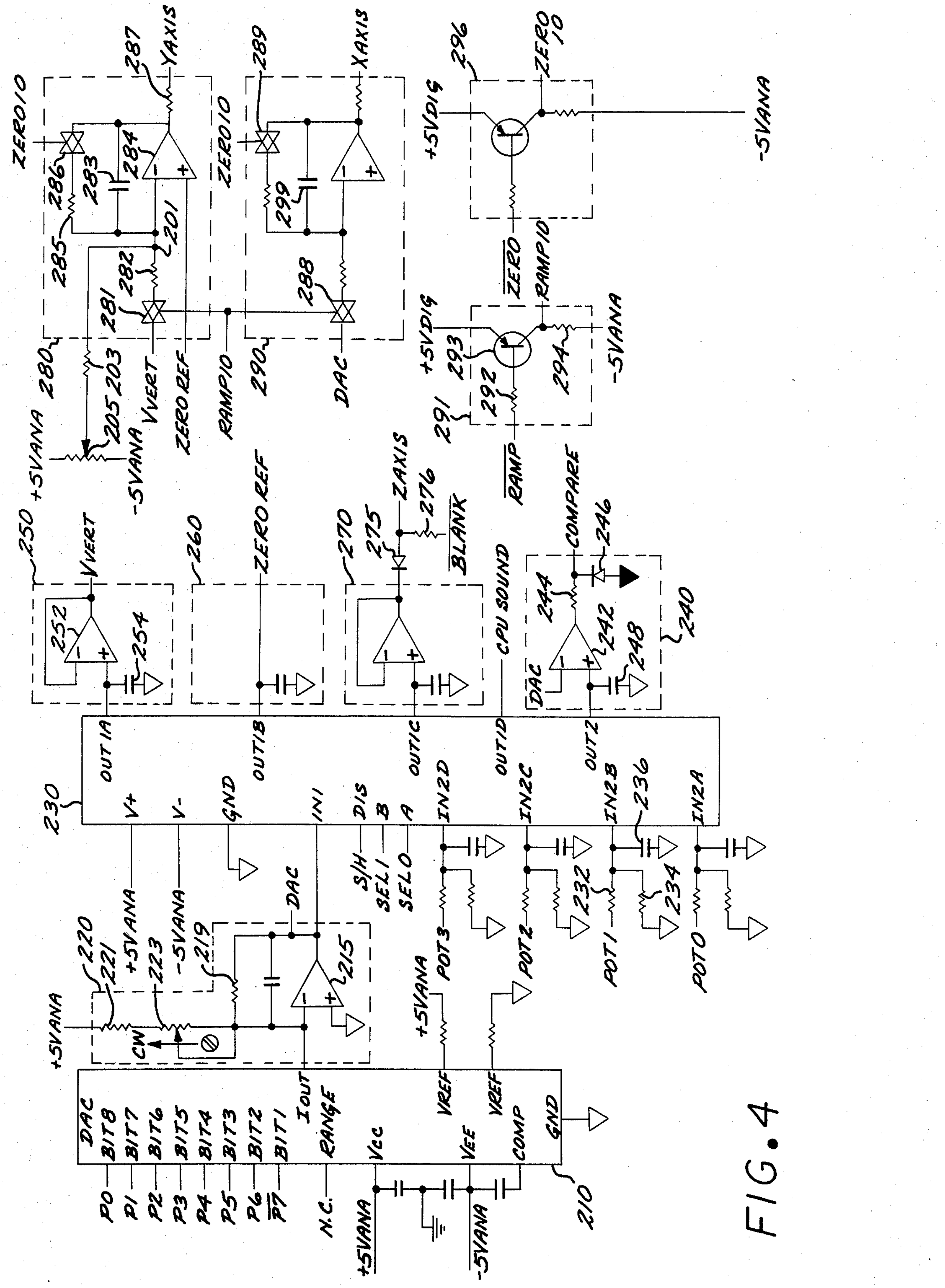
FIG. 4 is a circuit schematic illustrating the analog vector generator circuitry of the preferred embodiment.

Referring now to FIG. 4, a schematic of the analog processing section of the system is shown. DAC 210 comprises an 8 bit digital to analog converter, e.g. an MC 1408 P8 unit manufactured by Motorola, Inc. The digital input word is received at terminals Bit 1-Bit 8 of DAC 210. The output of the DAC 210 is a current source at terminal "I out". Converter 220 comprises a current to voltage conversion means to generate a voltage level representative of the value of the digital word received by DAC 210 at Bit 1-Bit 8. Converter 220 consists of differential amplifier 215, capacitor 217, resistances 219 and 221, and variable resistance 223. In the preferred embodiment, amplifier 215 is one section of a two-section amplifier chip type LF 353 (manufactured by National Semiconductor), capacitor 217 has a value of 47 pf, resistances 219 and 221 have values of 3.6 and 6.8 Kohms, respectively, and variable resistance 223 is a 1K, one turn potentiometer. Resistors 221 and 223 are used to introduce a negative offset to the current to voltage converter means. The reason for the negative offset is to provide a 2's compliment encoded DAC. For the same reason, Bit 7 of the digital data word is inverted. The output of connverter 220 is coupled directly to selector unit 230, and is also made available as the "DAC" signal.

Selector 230 comprises an RCA CD 4052 chip, a differential 4-channel multiplexer. Selector 230 serves two principle purposes. The first is to couple the output of converter 220 to one of four output terminals, OUT 1A-OUT 1D. The other purpose is to couple any one of four input terminals IN2A-IN2D to terminal OUT 2 of the selector.

The use of selector 230 allows, inter alia, a multipurpose use of DAC 210. Digital-to-analog converters are relatively expensive components and may require alignment or adjustment from time to time due to shifts in levels, etc. The present apparatus minimizes the number of such elements used in the circuit. In the preferred embodiment, DAC 210 is used to set horizontal and vertical deflection levels (as will be described more fully hereinafter), to set the z-axis (brightness) control signal and to generate levels used for audio sound generation, in the event sounds are to be MPU generated instead of by the sound generator chip 160.

DAC 210 is also used to generate comparison voltage levels to successively approximate a voltage level set by an operator control (potentiometer), and thereby to read the setting of hand controller potentiometer, e.g. in a joystick controller. Thus, selector 230 couples the appropriate operator-controlled voltage level (from terminals IN 2A-IN 2D) to comparator circuit 240. The signal presented, for example, to terminal IN2A is the "POT 3" voltage, coupled through the voltage divider of resistances 232 and 234. The values of these resistances are preferably 1K and 100K, respectively. Capacitor 236 is preferably a 0.01 microfarad value. The three other potential controlled voltage levels are all coupled to selector 230 by circuit means similar to that just described for the "POT 3" level.

Comparator circuit 240 comprises differential amplifier 242, 2.2 Kohm resistor 244, diode 246 and 0.01 microfarad capacitor 248. The "DAC" signal is presented as the "minus" input to the differential amplifier 242, and the signal at terminal OUT 2 of selector 230 is presented as the "plus" input. By successively changing the value of the digital word presented to DAC 210, the $\overline{DAC}$ signal level may be changed and a successive approximation performed between the "DAC" signal and the voltage controlled by the seleted potentiometer. When a comparative minimum is sensed at "COMPARE", then the MPU has determined the appropriate digital representation, i.e. the 8 bit DAC input word, for the current position of the operator controlled potentiometer. This digital representation may then be used in the game logic performed by the CPU, e.g. to change the position of an object displayed.

Sample-and-hold circuits are connected to each of terminals OUT 1A, OUT 2A and OUT 3A of selector 230. Sample-and-hold circuit 250 consists of 0.01 microfarad capacitor coupled to ground from the "plus" input of differential amplifier 252. Amplifier 252 comprises another amplifier section of the LF 347 chips heretofore described. The output of amplifier 252 is fed back to the "minus" input. Since amplifier 252 has a very high input impedance, a voltage sampled by capacitor 254 will be held at the amplifier output until a new voltage level is supplied to capacitor 254. The output of sample-and-hold circuit 250 comprises the "V VERT" signal, whose use will be described hereinafter.

Similarly, the output of sample-and-hold circuit 260 comprises the "ZERO REF" signal, whose use will be described hereinafter. A buffer amplifier is not needed for circuit 260.

The output of the third sample-and-hold circuit is coupled to the cathode of diode 275. The signal at the anode of diode 275 comprises the "Z AXIS" control signal. A "BLANK" signal is also coupled to the anode of diode 275 through 1.8 kohm resistor 276.

The analog processing circuitry includes two integrator circuits 280 and 290, which develop the deflection signals for the CRT. The two circuits are similar, and only integrator 280 will be described in detail. Signal "V VERT" is coupled to integrator 280 via switch 281 and 10K resistor 282. The integrator comprises differential amplifier 284 having "plus" and "minus" inputs. Capacitor 283, preferably a 0.01 microfarad capacitor, is connected between the "minus" input and the amplifier output. Also coupled between the "minus" input and the output are 180 ohm resistor 285 and switch 286. The output of the differential amplifier 280 is coupled via 75 ohm resistor 287 to form the "Y AXIS" signal. The "plus" input to amplifier 284 is the "ZERO REF" signal. The "minus" input to the amplifier is the "V VERT" signal coupled through switch 281 and resistor 282.

In the preferred embodiment, differential amplifier 284 comprises one of four amplifier sections of an LF 347 chip. Connected as shown in FIG. 4, the amplifier 284 with capacitor 283 will act as a voltage integrator, the "Y AXIS" signal linearly changing, provided a constant voltage is applied at the "minus" input to amplifier 284.

The amplifier has the well-known properties of a very high gain, and, in the feedback connection shown the output level will be adjusted until the "minus" and "plus" inputs are at the same level. A shift in the "ZERO REF" level will accordingly shift the output voltage also. When switch 281 is closed and switch 286 is open, integrator 280 will operate to integrate the input level applied to the "minus" input.

If the "plus" input of the amplifier is at ground potential, the level at the "minus" input will be at a virtual ground. Accordingly, the current through resistor 281 will be (V VERT)/resistor 282. With switch 286 open, this current will flow into capacitor 283. The voltage across capacitor 283 will change at the ratio of the ratio of the current and capacitance. Since the input impedance to amplifier 284 is extremely high, virtually all current flowing through resistor 282 will flow into capacitor 283. Closing switch 286 will, of course, short out, i.e., initialize, the voltage across capacitor 283.

A compensation circuit is added to integrator 280 to compensate for offset currents of amplifier 287. A small compensation current may be supplied through the divider circuit of 10K potentiometer 205 and 5.1 Megohm resistor 203 to node 201. Appropriate selection of resistor 205 will provide a compensating current to reduce the effects of the amplifier 287 and 252 offset currents. Since integrator 290 is not coupled to a sample-and-hold amplifier circuit, as in integrator 280, a separate compensation circuit for this amplifier is not considered necessary.

Switches 281 and 286 are actuated by signals "RAMP 10" and "ZERO 10", respectively. These signals are in turn generated by a digital signal at PIA 150, level-shifted by networks 291 and 296. Level-shifting networks 291 and 296 are similar, with the digital level acting as a signal to bias "on" a switching transistor. Hence, in network 291, digital level "$\overline{\text{RAMP}}$" is applied through resistor 292 to PNP transistor 293 to bias the transistor to the "on" state. When transistor 293 is "on", the voltage at the collector (the "RAMP 10" signal) will be approximately 5 volts, and with the transistor "off", the "RAMP 10" signal will be at approximately-5 volts. These levels are selected to assure proper switching action of switches 281 and 286. These switching signals also operate the corresponding switches associated with integration 290. Hence, switch 281 is ganged with switch 288, and switch 286 is ganged with switch 289.

It may be seen that integrator 280 and 290 are operative in the following manner. Switches 286 and 289 may be closed to short capacitors 283 and 299 to initialize the integrators, and then opened. Switches 281 and 288 may then be closed to apply signals "V VERT" and "DAC", respectively to the integrators. Assuming these signals represent positive constant voltage levels, the voltages across the capacitors 283 and 299, and consequently signals "Y AXIS" and "X AXIS", will linearly increase with time. By opening switches 281 and 288, the voltage across the capacitors will be held constant. The rate at which the capacitors are charged is dependent upon the voltage levels of signals "V VERT" and "DAC". On the other hand, if the integrator is not initialized, the integrator output will be held at the same start voltage. Closure of switch 281 or 288 will cause the integrator output to change from its initial voltage, instead of from zero. This feature represents a major improvement, in that a line segment forming part of an object need only be defined by its end point location, since the integrator output will "hold" the voltage level representing the end point of the last segment drawn. The initial starting point need not be separately computed or defined. A "curved" line may also be drawn by varying the DAC signal while integrator switches 281 and 288 are closed.

Figure 5:
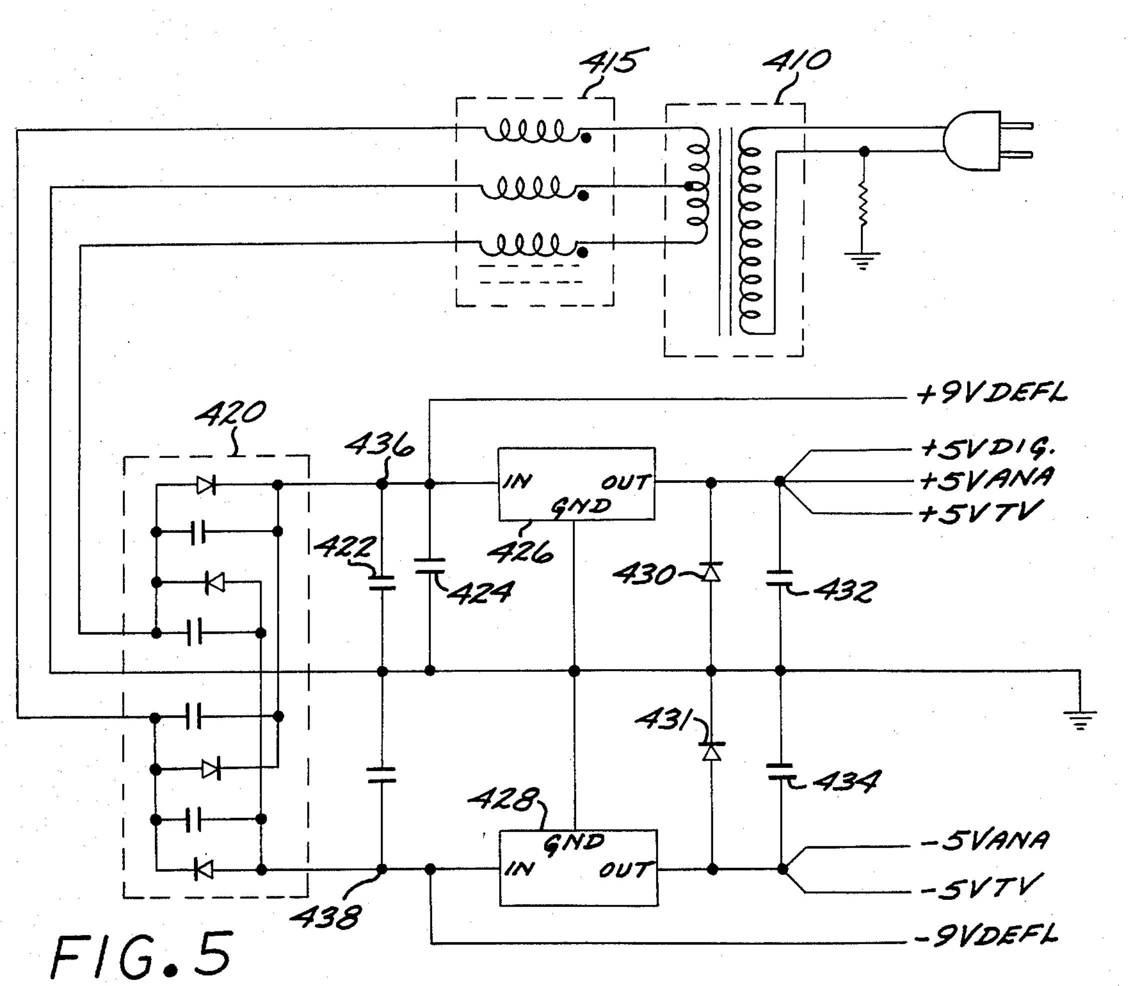
FIG. 5 is a schematic drawing illustrating the power supply circuitry of the preferred embodiment.

Referring now to FIG. 5, the power supply circuit is shown. The supply is operative to supply ±9 volts (unregulated) to the deflection circuitry, as well as ±5 volts (regulated) to the digital and analog processing circuitry. A novel aspect of the power supply circuit is its capability of developing these supply voltages from one transformer winding. 120 volt AC is delivered to transformer 410, whose secondary winding drops the voltage to 16 volts AC. FCC choke 415 couples this voltage to full wave rectifier bridge 420. The rectified signal is approximately +9 volts at node 436, and −9 volts at node 438. These unregulated voltages are used to supply the deflection circuit. (FIG. 6). +5 volt and −5 volt regulations 426 and 428 are coupled, respectively, to nodes 436 and 438 to produce the regulated ±5 volt supply used for the digital, analog and high voltage circuits. Each of these circuits performs separate filtering on the regulated voltage.

Figure 6:
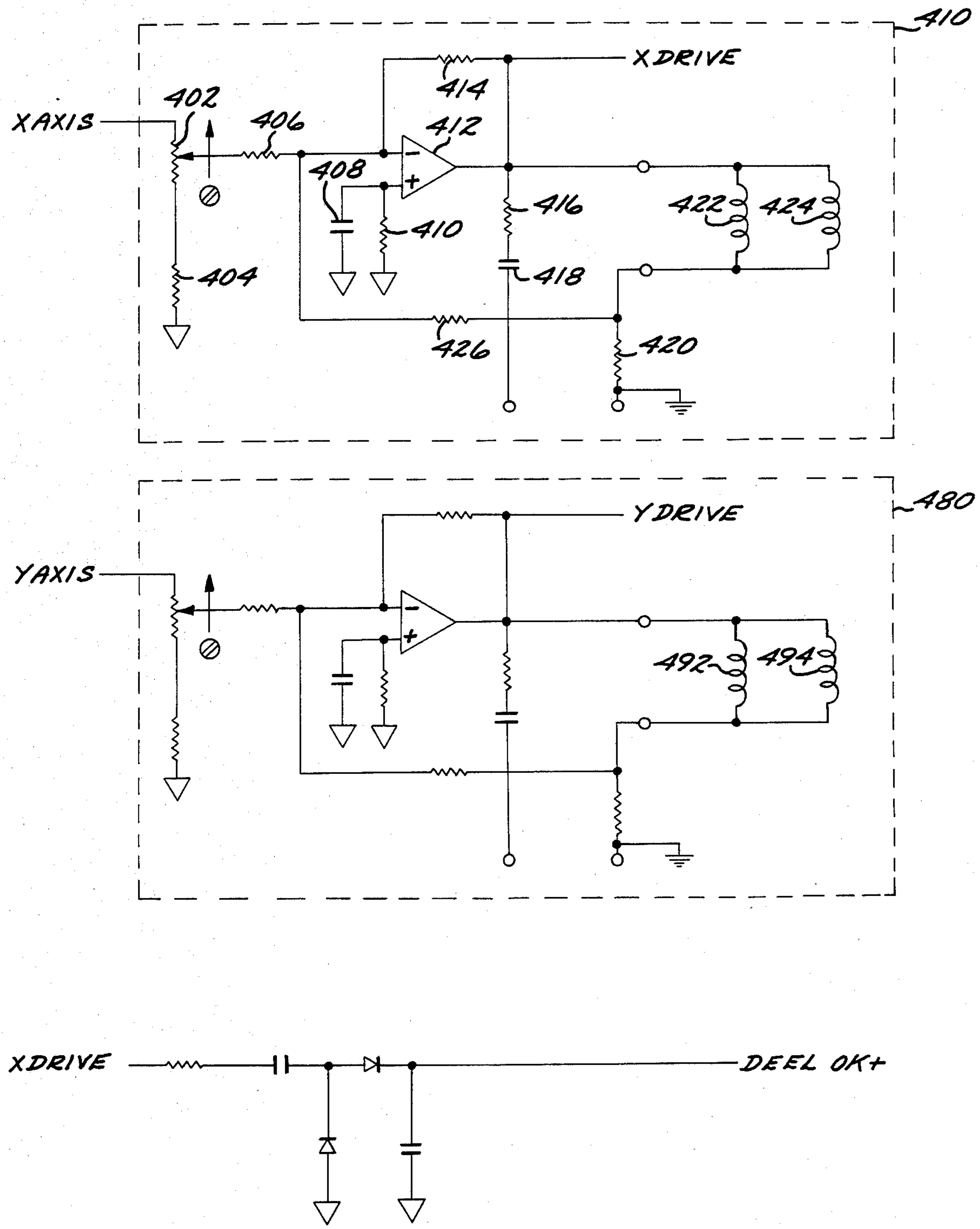
FIG. 6 is a schematic drawing illustrating the CRT deflection circuitry of the preferred embodiment.

Referring now to FIG. 6, the deflection amplifier circuitry is shown for driving the deflection coils of the CRT. Separate circuits 410 and 480 are provided for driving the X deflection coils and the Y deflection coils. Since the circuits are similar, only the X deflection circuit 410 will be described.

Signal "X AXIS" represents the signal input to the X deflection circuitry, and is coupled through the voltage divider circuit of resistor 402 and 404 and through resistor 406 to the "minus" input to amplifier 412. In the preferred embodiment, resistor 402 is a 1K, one turn trim potentiometer, resistor 404 is a 3.3 Kohm resistor, and resistor 406 is a 15 Kohm resistor. Differential amplifier 412, in the preferred embodiment, is one amplifier section of a type LM 379 circuit, a dual six watt direct coupled amplifier. The "plus" input of amplifier 412 is connected to ground via the parallel connection of 3.3 Kohm resistor 410 and 0.1 microfarad capacitor 408. The output of amplifier 412 is fed back to the "minus" input through 1 megohm resistor 414, and is also brought out as signal "X DRIVE". The output is also coupled to ground through 1.5 ohm resistor and 0.01 microfarad capacitor 418. The output of amplifier 412 drives the parallel connection deflection coils 422 and 424, which in the preferred embodiment represent an approximately 800 microhenry inductance. The coils are connected to the X RETURN ground through 0.22 ohm resistor 420. The voltage across resistor 420 is fed back to the "minus" input of amplifier 412 through resistor 426.

In this configuration, circuit 410 operates as a voltage to current driver. For example, a linearly changing voltage, "X AXIS", presented to the circuit is converted into a linearly changing drive current through the deflection coils 422 and 424, by operation of the voltage feed-back from resistor 420. The drive current through the coils forms the electromagnetic field which deflects the CRT electron beam.

Y deflection circuit 480 operates in a similar manner, with the "Y AXIS" signal forming the voltage input signal being converted into a drive current through Y deflection coils 492 and 494.

Figures 7, 8:
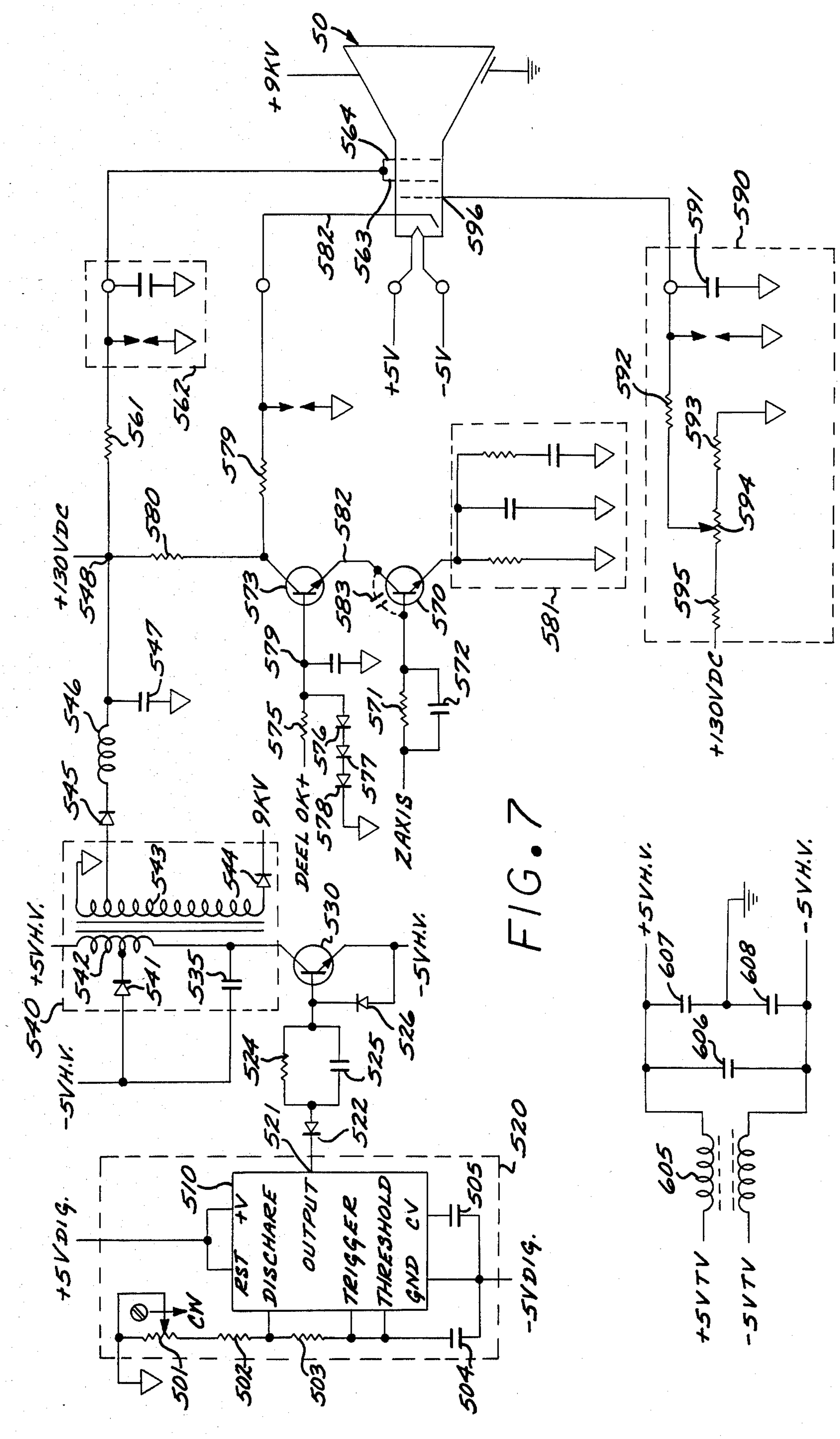
FIG. 7 is a schematic drawing illustrating the high voltage generation circuitry of the preferred embodiment.
FIG. 8 is a schematic drawing illustrating the filter circuit for cancelling balanced current noise for the voltage supply of the preferred embodiment.

Referring now to FIG. 7, a schematic of the high voltage section of the apparatus is illustrated. The circuit generates nine kilovolts for application to the CRT.

Oscillator circuit 520 provides the control signals resulting in excitation of the Tesla coil flyback circuit. Circuit 520 includes timer 510 which provides a pulse wave output at output terminal 521. In the preferred embodiment, timer 510 comprises a type LM 555 type timer, whose operation and oscillation rate is controlled by 1 Kohm potentiometer 501, 6.8 Kohm resistor 502, 10 Kohm resistance 503, 0.0022 microfarad capacitor 504, and 0.01 microfarad capacitor 505. The output signal of timer 520 is a square wave with voltage levels of ±5 volts, and is connected to the cathode of diode 522. Resistor 523 connects the anode of diode 522 to the +5 volt supply. The parallel combination of 75 ohm resistor 524 and 2 microfarad speedup capacitor 525 connects the cathode of diode 522 amd resistor 523 to the base of switching transistor 530. Diode 526 is coupled cathode to anode from the base of the transistor to ground.

Flyback circuit 540 develops 9K volts from the ±5 volt supply voltage. One side of the primary coil 542 of the transformer is connected to the +5 volt supply, and the other side connected through switching transistor 530 to the −5 volt supply. Damper diode 541 couples the primary winding 542 to the −5 volt supply. Timing capacitor 535 (0.022 microfarad) tunes the primary coil for resonant operation.

The timer 520 drives the flyback circuit in the following manner. With the timer output 521 at the high state (+5 volts), diode 522 will be back-biased, and biasing current will flow through resistors 523 and 524 to bias transistor 530 "on". With current flowing through the primary coil, a magnetic field will be set up. When the timer output shifts to the lower state (−5 volts), diode 522 conducts, and the biasing current flows into terminal 521 instead of to transistor 530, turning the transistor "off". The sudden switching "off" of the primary coil current will cause the magnetic field to collapse, inducing high voltage spikes in the secondary coil of the flyback transformer. When tuner output 521 shifts to the "high" state, transistor 530 will again be turned "on", speedup capacitor 525 serving to increase the switching speed.

The above-described operation results in a voltage of 130 volts at node 548, from the boost winding of the flyback transformer through inductor 546 and diode 545, and 9K volts at the high voltage winding. The 9K volts is supplied to the anode of CRT 50. Node 548 is coupled through 1.5 Kohm resistor 561 and spark gap device 562 to the acceleration anode 563 and focus grid 564 of CRT 50.

The video control signal is "Z-AXIS". The parallel connection of 220 ohm resistor 571 and speedup capacitor (100 picofarad) capacitor 572 couples the "Z-AXIS" signal to the base of transistor 570. The collector of transistor 570 is connected to the emitter of transistor 573, whose collector is coupled through 1.5 Kohm resistor 579 to the cathode 563 of CRT 50.

Transistor 573 is biased "on" by the "DEFL OK" signal, applied through 3.3K resistor 575 to the base of transistor 573. The parallel connection of 0.01 microfarad capacitor 574 and series diodes 576, 577 and 578 couples the base to ground. The voltage at mode 579 is therefore limited at the voltage drops across the three diodes, i.e. about 1.8 volts. Thus, when transistor 570 is turned "on", the emitter of transistor 573 will be at a voltage level of approximately 0.8 volts, so that a base voltage of at least approximately 1.2 volts is required to bias the transistor 573 to the "on" state.

Connected in the above manner, transistor 573 operates as a current amplifier. The collector current of transistor 573 will adjust to allow the voltage at node 582 to remain constant at approximately 0.8 volts with both transistors 570 and 573 biased "on". The collector current flows from node 548 (at 130 volts) through resistor 580, creating a voltage which determines current flow through resistor 579 into the CRT cathode.

While transistor 570 could be used to drive the cathode, the additional transistor 573 provides several advantages. It provides additional gain to the circuit. It also provides an additional element which may be used to turn off the cathode current. Transistor 573 also operates to maintain a constant voltage at the collector of transistor 570, obviating the Miller capacitance 583 of the base-collector function of the transistor which would otherwise significantly slow collector voltage changes.

Brightness control circuit 590 is provided to allow an operator control over the brightness of the CRT beam. Resistors 595 and 593 are 1 Megohm and 100 ohm resistors, respectively, while element 594 is a 2 Megohm potentiometer, all forming a voltage divider circuit for determining the voltage applied to the control grid. By adjusting the potentiometer 594, the operator may adjust the brightness of the beam, independent of the "Z-AXIS" signal which also modulates the brightness by varying the cathode current.

FIG. 8 illustrates a filter circuit for cancelling balanced current noise from the ±5 volt high voltage supply. The ±5 volt T.V. supply from the power supply circuit is delivered to transformer 605. 470 microfarad capacitor 606 and 10 microfrarad capacitors 607 and 608 interact with the transformer to cancel out balanced current noise.

There has been described above a detailed circuitry which is utilized in the preferred embodiment of the present invention. It is well-known in the art, of course, to connect a central processing unit or a microprocessor to a peripheral interface adaptor, to address decode chips, and to ROMs, RAMs and other peripheral devices. This represents a common figuration used in microprocessor controlled circuits (see for example, the "Motorola Microprocessors Data Manual," published by Motorla, Inc. The adaptation of the CPU to the analog circuitry described herein, and the function of the CPU in controlling the operation of the entire apparatus, is considered novel.

The system is initialized after power up by the operator pressing the "reset" button 113 which, through reset circuit 112 (FIG. 3), initializes the system so that the MPU starts operation at the proper address location. The operation of the microprocessor will, of course, depend upon the particular game to be played as stored in ROM 140 or the optional external cartridge ROM. A logical flow chart illustrating the display generation routines and operations of an exemplary circuit will be described hereinbelow. However, certain control signals are generated, of course, by the digital chips, and information is stored and made available to the analog circuitry for generating the appropriate deflection signals. Data is provided from PIA 150 to DAC 210 at terminals Bit 1–8. This information may, for example, be coordinate information of a vector, a digital word representative of the desired brightness level, or information employed in the successive approximation to determine the setting of the operator joystick or potentiometers. The DAC output is made available to terminal IN 1 of selector 230, to switch 288 of integrator 290, and to comparator circuit 240. Successive data words may be presented to DAC 210 which for example define (1) the vertical component of a line segment to be drawn (which is stored by the sample-and-hold circuit 250 upon proper selection of the data selector 230), (2) the zero reference voltage, which results from a zero setting of the DAC to determine the specific analog voltage corresponding to the zero setting, (3) the Z-axis brightness which is sampled and held at sample-and-hold circuit 270, (4) MPU generated audio signals, or which, in the successive approximation mode, may be continuously varied until the voltage setting at the joystick has been successively approximated.

The DAC 210 is set-up as an 8 bit 2's compliment output to facilitate use of the undeflected position of the CRT beam as the coordinate origin. Thus, if the range is −2.56 volts to +2.54 volts then the following code (hexadecimal) is appropriate: 00=0 volts, FF=−0.02 volts, 80=−2.56 volts, 0.1=+0.02 volts and 7F=+2.54 volts. To provide a zero control signal to the DAC 210, the code 00 (hexadecimal) is provided to the input data port of DAC 210.

The analog integrators may be initialized by closure of switches 286 and 289 to short out the integrating capacitors 283 and 299, e.g. at the commencement of an object drawing. Control voltage $\overline{\text{ZERO}}$ is generated by PIA chip 150, level shifted at network 296 to "ZERO 10" and applied to the switch controls to either switch to the "closed" or "open" $\overline{\text{RAMP}}$ signal which is in turn level-shifted to the RAMP 10 signal and simultaneously applied to the control gate of switches 281 and 288. The $\overline{\text{RAMP}}$ at terminal 17 to PIA chip 150 is the output to timer number 1 of the PIA chip. In the preferred embodiment, the timeout interval of this timer, i.e. the time interval, the "DAC" signal and the "V VERT" signal are applied to the respective integrators, selectively variable. To vary the length of the vector being drawn, this timer may be set to time out at a shorter or longer time interval. This is extremely useful to scale the size of objects. For example, an object may be defined in the ROM to substantially occupy the entire screen, to utilize the full resolution capability of DAC 210, and then scaled down by varying the length of the vector timer to virtually any scale. This greatly increases the available apparent resolution in drawing an object as, otherwise one would be limited by the 256 steps of the DAC 210. This also has the advantage that the objects, regardless of scale, appear as the same intensity. This result occurs because the writing speed, upon which the intensity is dependent, remains constant as an object size is scaled. Hence, an object can be drawn with great resolution to very small scale.

As heretofor mentioned, the comparator circuit 240 is used to determine the position of the operator joystick which is conventional in that it comprises X and Y position potentiometers, for example, POT 0 and POT 1 as disclosed in FIG. 4. The readings from the potentiometers may be used to shift the position of objects and so on. The use of such joysticks, in and of themselves in conjunction with video arcade games is well-known in the art and need not be described in detail here.

While in the preferred embodiment, the sound generator chip 160 is normally used for generation of sound effects, it is contemplated that the MPU may itself generate sounds by appropriate utilization of DAC 210 selected through data selector 230 and applied to the audio amplifier (not shown), e.g. for voice synthesis. This is useful because the sound generator chip is only capable of generating square wave signals.

While the operation of the deflection amplifiers has been described in some detail hereinabove, it should be noted that the output of amplifier 412 is brought out as the "X-DRIVE" signal, which is used to generate a deflection loss protection signal used to blank the beam current when the beam is not deflected in the X direction. This is to prevent the phosphors of the tube from being burnt out at the center of the tube during a software or hardware failure. The "X-DRIVE" signal is rectified to produce the "DEFL OK" signal which is applied to the high voltage circuit (FIG. 7) as the source of base current to transistor 573. Hence, so long as the X-DRIVE signal is greater than approximately one and one-half ($1\frac{1}{2}$) volts peak-to-peak, sufficient voltage will be applied to the 3-diode series connection to bias the amplifier 573 in a conducting state. When, however, the X-DRIVE signal falls below the $1\frac{1}{2}$ volt signal, signifying a very low deflection, the beam current will be turned off.

PIA chip 150 provides four basic functions to the apparatus of the present invention. Its peripheral A port (PA 0–PA 7 terminals) is used to drive the DAC and to interface with the sound chip 160.

Port B of the PIA chip 150 is used as the control pins for the sound chip, selector 230 control, reading the A/D comparator in the successive approximation of the joystick potentiometer, and issuing the RAMP command.

The PIA chip includes two timers, the first (timer 1) used as the RAMP timer for the vector generator, driving output pin PB 7. It automatically times out the RAMP pulse if used in the one shot mode. The second timer (timer 2) of the PIA chip is used as the frame timer. It is preferably set for a one shot time-out of 20 milliseconds, for example, for 50 Hz refresh. It is desirable to refresh the display at at least this rate for a good motion portrayal and realistic game feel.

The PIA chip 150 also includes a shift register. Line CB 2 acts as a serial port under control of the shift register to provide the signal $\overline{\text{BLANK}}$. The shift register can be used as a discrete high or low output, or as a serial shift register for video blanking. Thus, if the system is in the mode of drawing an initial position vector, the bit would be turned "low" before the RAMP is initiated so that the cathode beam current is turned off. If the line segment is to be drawn, then the bit is set "high" before ramp to turn the beam current on. The shift register may also be used in a parallel to serial shift register mode to allow the beam current to be blanked at a faster rate than would otherwise be possible by the CPU. Thus, by loading an appropriate word into the parallel shift register, a series of dots and dashes may be generated as a line segment is drawn.

Figure 11:
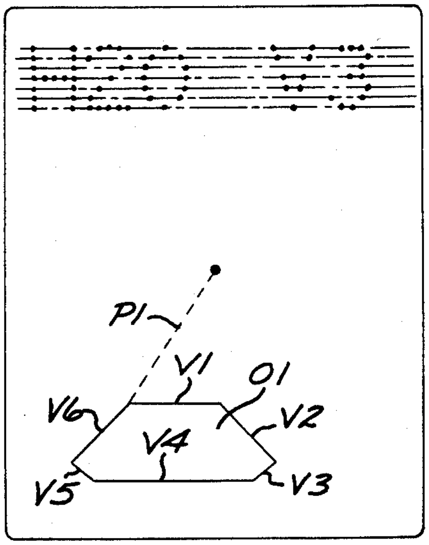
FIG. 11 illustrates a CRT display object in accordance with the object generation method of the present invention.

The parallel to serial shift register may also be used to provide a psuedo raster scan display format. To provide this format, the microprocessor is arranged to move the CRT beam through a series of parallel, closely-spaced, vectors. The data read into the parallel port of the shift register is appropriately arranged to activate the beam in each vector in such a way as to conte, for example, an alphanumeric character. A 5×7 dot matrix capability is illustrated in FIG. 11. The psuedo-raster generated matrices may be manipulated (e.g. rotated, scaled or moved) in the same manner as other objects.

Figure 12:
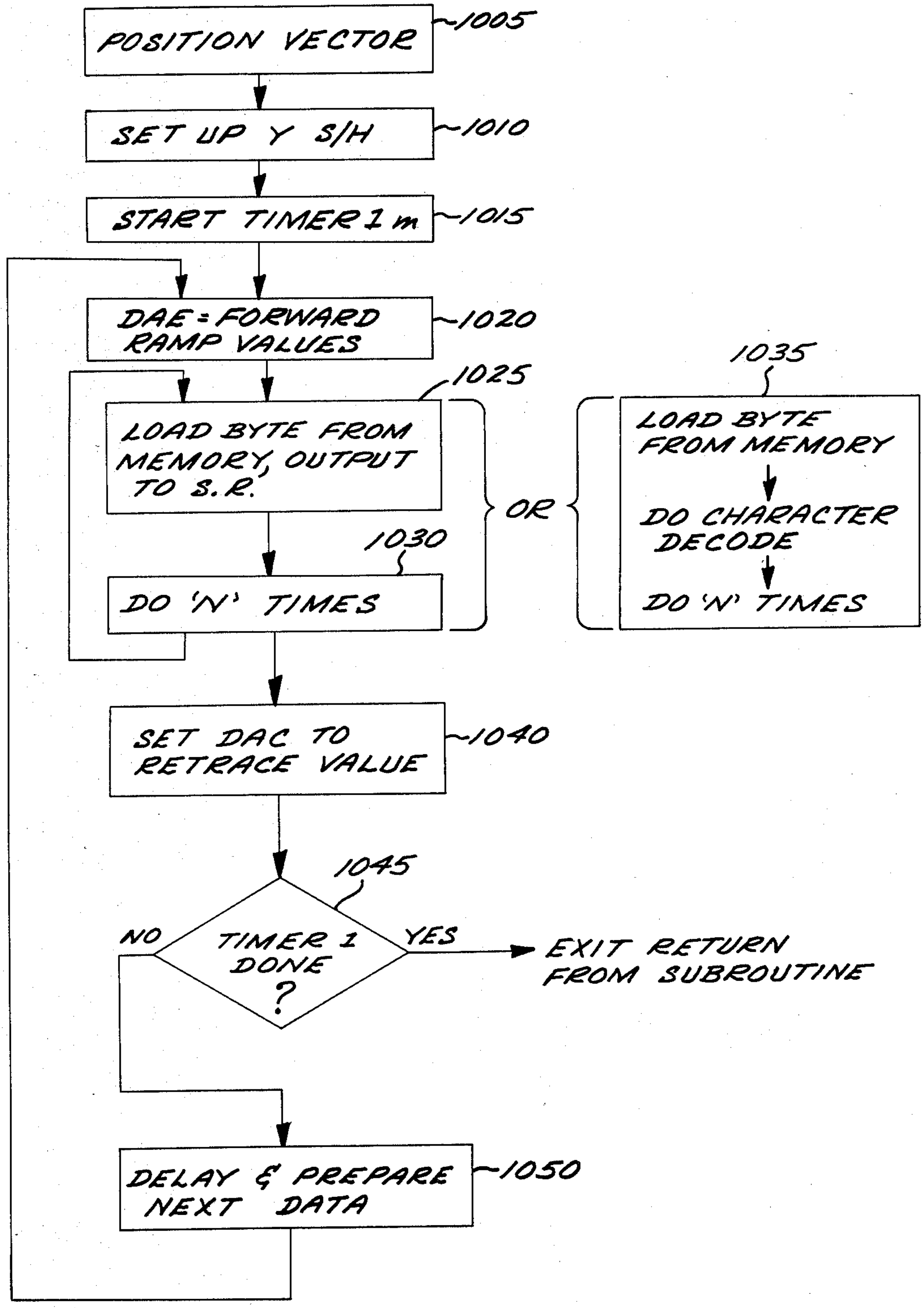
FIG. 12 illustrates the logic operation of drawing a psuedo raster scanned display.

Referring now to FIG. 12, a flow diagram illustrating a logic operation for generating a pseudo-raster scanned display is shown. At step 1005, a positioning vector as drawn to the position at which the pseudo-raster scan display is to commence, e.g. at the upper left hand corner of the display. At step 1010, a vertical signal to be provided to integrator 280 and having the lowest possible value is established at sample-and-hold network 250. A very slow vertical movement will then be established. At step 1015, PIA timer T1 started at a timer equivalent to that needed to write in lines of data (eight in the illustration of FIG. 1). At step 1020, DAC 210 is set to the forward ramp value, i.e. the horizontal voltage level to be applied to integrator 290. This voltage level establishes the "raster" beam speed, and, for an 8 bit DAC, might be a value of 40.

At step 1025, a data byte is loaded memory and provided to the parallel-to-serial shift register of PIA chip 150, which outputs the byte in serial form to provide the $\overline{\text{BLANK}}$ signal at terminal CB2, which in turn turns the beam current "on" or "off" to draw a series of dots and blanks, respresenting certain dots in a dot matrix. The format of the data byte for an eight bit might, for example, be to use the most significant 5 bits for data (i.e. for the 5 horizontal dots of a dot matrix character), with the least significant 3 bits being set to zero to space the characters and blank the beam after each character. Step 1030 represents repeating step 1025 in dependence upon the number of characters or the width of the display.

An alternative to steps 1025 and 1030 is shown as step 1035. The data byte stored in memory could be representative of the characters and a character decode operation performed to provide actual data to the PIA shift register.

At step 1040, after completion of drawing one "raster" line, the DAC 210 is set to the "retrace" value to establish the retrace speed, e.g. 128 for a fast retrace. The integrator 290 is not zeroed during the entire raster sequence). At step 1045, the timer 1 is checked for timeout. If timeout has occurred, the raster scan routine is over. If not timed out, at step 1050, delay occurs to allow the "retrace" to return to the left side, and the next data is prepared to write another line of the pseudo-raster scan.

The microprocessor and associated digital devices may, of course, be programmed many ways to achieve the desired operation. In the preferred embodiment, the following hexadecimal memory address map is assigned to the ROMs, RAMs and PIA chip:

| Circuit Element | Assigned Addresses |
|---|---|
| Cartridge ROM | 0-7FFF (32K) |
| ROM 140 | E000-FFFF (8K) |
| PIA Chip 150 | D000-D00F (16 bytes) |
| RAMs 120, 130 | C 800-CBFF (1K) |
| PIA Chip 150 + RAM | D 800-D80F (16 bytes) |
| SPARE (not decoded) | 8000-BFFF (8K) |

The address locations issued by the MPU 110 are decoded by address decoders 180 and 190, so that the appropriate peripheral device is enabled when needed by the MPU.

Figure 9A:
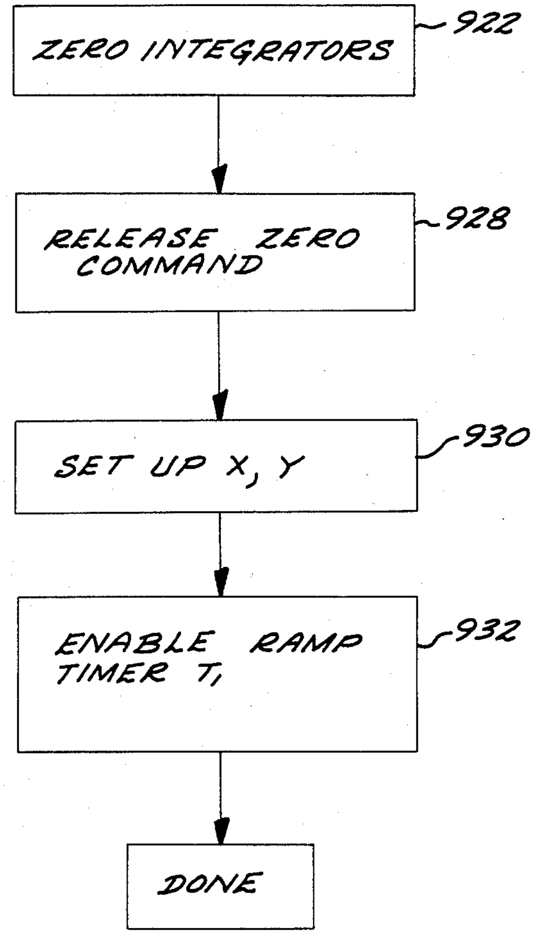
FIG. 9A illustrates the logic operation of moving the CRT electron beam through a position segment in accordance with the present invention.
Figure 9B:
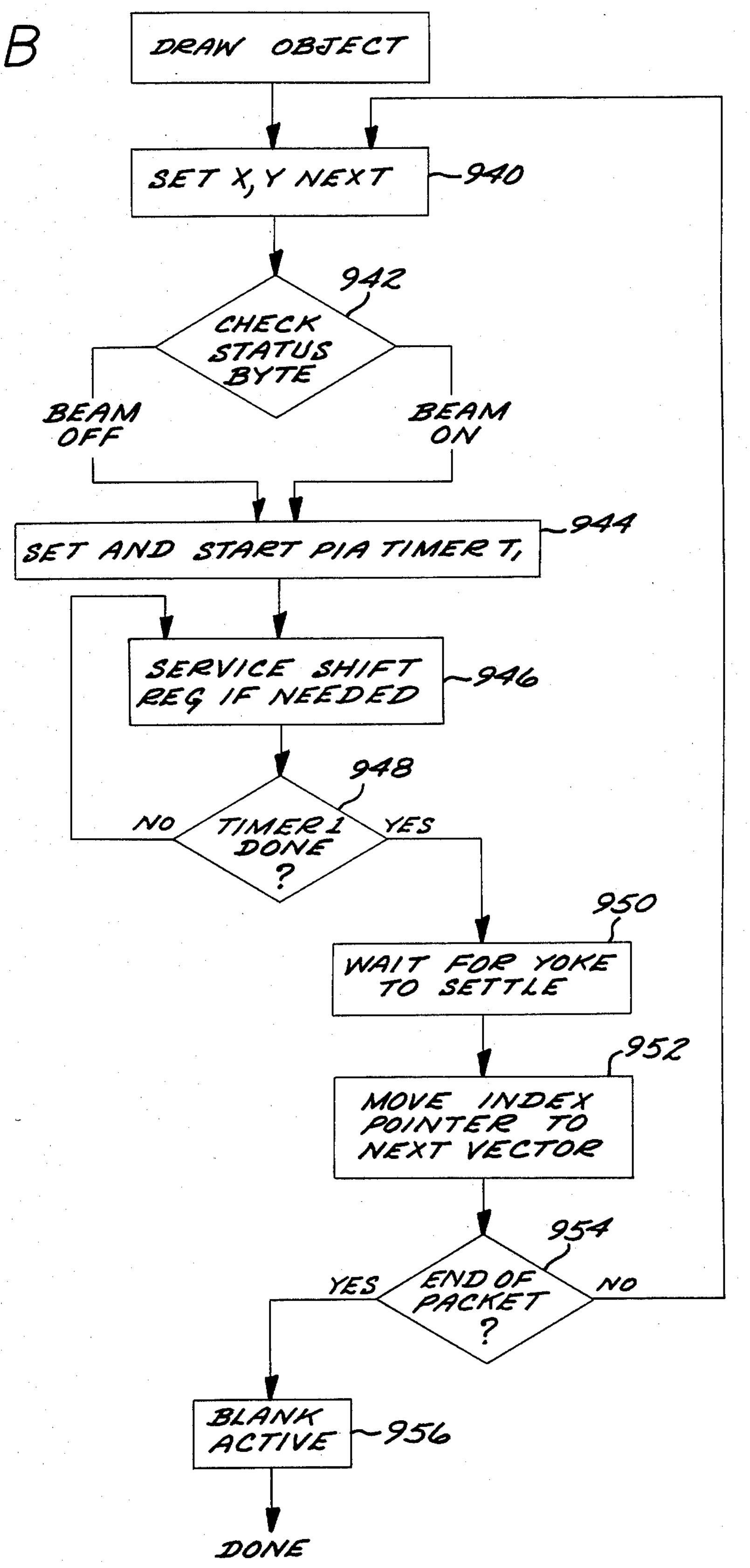
FIG. 9B illustrates the logic operation of drawing an object in accordance with the present invention.

A primary characteristic of the present invention is the efficient technique used for the display, particularly directed to the generation of objects (i.e. a series of interconnected line segments, or "vector packets") rather than a series of independent line segments. FIGS. 9A and 9B illustrate simple logical flow diagrams for displaying images according to the present invention. The first logic step is to perform the absolute positioning, i.e. to deflect the position of the CRT cathode beam from the origin of the CRT (0,0) to the location of the object to be drawn. Normally, the CRT beam is blanked when moving through a position vector. Though there is no beam to actually deflect, the deflection circuitry is positioned as though a beam were present. This non-writing, positioning process may be thought of as "moving a beam or vector." The origin corresponds to the undeflected position of the CRT beam. FIG. 9A illustrates the steps of a program subroutine to accomplish this result.

At step 922, the integrators are zeroed (i.e. initialized) by closing the switches shorting the integrating capacitors, and the CRT beam is turned off (the $\overline{\text{BLANK}}$ signal is active). At step 928, the integrators are released, i.e., switches 286 and 289 are opened by disabling the "zero" signal. At step 930, the new "X" and "Y" values defining the X and Y components of the position vector are set, i.e., by action of DAC 210, converting digital values for the X and Y components into respective analog values, the Y component being sampled and held as "V VERT", and the X component being provided as "DAC". At step 932, the X and Y component lengths are set by adjusting the timer of PIA 150 (the length of the position vector may, of course, be scaled by increasing or decreasing the timeout interval of PIA timer 1). Switches 281 and 288 are then closed, applying the X and Y component voltage signals to the integrators. After timeout of the timer, the deflection circuitry has been appropriately repositioned to commence drawing an object and switches 281 and 288 are opened by PB 7 (the timer 1 output) automatically.

The CRT beam is blanked, or turned "off" during the positioning movement. The actual location of the absolute position may be selected as the commencement of one line segment comprising the object, or in centralized location adjacent the object segments, e.g. in the middle of a square object. If the centralized position is chosen, then the object definitions stored in memory will include a relative position move (i.e. with the CRT beam turned "off"), from the centralized location to the beginning point of the one of the line segments comprising the object. The choice as to whether to use a relative "move" from the absolute position is a matter of programming choice, and would depend upon the game and associated display parameters. Use of a relative "move" would allow a series of objects to be drawn prior to return of the beam to the origin. In this context, the game display logic could view the initial separate object drawn following an absolute position move, and each succeeding separate object drawn by a relative movement without return of the deflection circuitry to the origin, as a "composite object." Use of a relative "move" is also useful in performing an object "zoom", where the size of an object is rapidly scaled up or down. If the absolute position vector is drawn to the zoom center of the object, i.e. that point which does not appear to move during the zoom process, then the process may be carried out simply by progressively changing the timeout interval of timer 1 of PIA chip 150 for the relative move and object segments, greatly reducing the amount of computation required for this display technique, as now of the absolute position of the object or position vector need be separately computed.

The apparatus is operable to modulate the intensity of the beam for each line segment, or for a part thereof, since the writing speed remains substantially constant, irrespective of the length of the vector. The intensity may be modulated by provision of a digital data word to DAC 210 and conversion thereof into the "Z AXIS" signal, which modulates the CRT beam current. The beam may also be turned "on" or "off" by the $\overline{\text{BLANK}}$ signal, for drawing dashed or blanked vectors.

A preferred way to store object or vector packet information is by the following format:

Byte 0=Status Byte (00-7F)
Byte 1=Differential 'X' value
Byte 2=Differential 'Y' value
Byte N=Status Byte (00-7F)
Byte N+1=Differential 'X' value
Byte N+2=Differential 'Y' value
Byte N+3=00 (Packet terminator)

The status byte may typically include information defining the PIA timer 1 interval, to define the lengths of the differential X and Y components of the line segments. The status byte may also be used to determine whether the CRT beam is blanked or "on" during a vector generation or, if "on", its brightness (i.e. "Z AXIS"). In a second preferred format, useful, e.g. when the beam intensity and scale of an object is stored or computed separately, a two byte per entry table is more efficient.

By way of example, the following is a description relating to the data content of a vector packet as derived from an object description. Thus, for example, a 4 unit by 4 unit square may be defined by the position coordinates $X_n$, $Y_n$ referenced to the origin of an X,Y grid. Then in vector notation the nodal points of the square are at (2,2), (2,−2), (−2,−2), (−2,2). However, the transition from each of these nodal points to the next successive nodal point of the square figure as set forth in the present application results in the following differential vectors: (0−4), (−4,0), (0,4), (4,0).

If the above object is to be drawn, for example, at an absolute position on a CRT screen having coordinates (30,30), then a blanked positioning vector (30,30) would first be moved to the center of the square, and a blanked relative position vector (2,2) moved from (30,30) to a first nodal point of the square. The initial vector (30,30) might be used to define the center of "zoom", and is of blanked intensity when made so that it is considered as a move rather than as a draw operation. This vector essentially is placed at an artificial center of the object as projected onto the two-dimensional display. Translation can be made to appear continuous by incrementing the positioning vector at the framing rate of 50 cycles per second.

The 6809 microprocessor used in the preferred embodiment has powerful addressing modes, 16 bit arithmetic capability, and multiple index registers. Those features allow easy retrieval of vector information stored or generated, for example, in the format described above.

FIG. 9B illustrates the steps involved in drawing an object (or vector packet) once the absolute position has been set. The figure illustrates the beam current being turned on for all line segments, although the disclosed system is capable of modulating the beam current for each line segment or object. At step 940, the differential X and Y values for the first line segment are set by DAC 210. This step includes the loading by the MPU of respective digital words into the data port of DAC 210 defining the differential X and Y components of the line segment into, and applying the respective voltage levels generated by the DAC to the switches 281 and 288. At step 942, the status byte is checked. The CRT beam is turned "on" or "off", depending upon status byte information. At step 944, the timeout interval of PIA timer T1 is set and the timer started, and switches 281 and 288 are closed to start integrator operation. At step 946, the PIA shift register is serviced if required, i.e. if the high speed blanking is to be employed in drawing the vector (typically for a pseudo-raster generated line), an appropriate eight bit word must be loaded into the shift register. As step 948, PIA timer T1 is checked to determine if it has timed out. The shift register is repeatedly serviced until T1 times out. Once this occurs, a predetermined delay may be required to allow the deflection yoke field to settle; this delay takes place at step 950 if the particular CRT design requires such a delay. At step 952, the program index pointer is moved to the next vector data set in order. At step 954, a test is performed to determine if the end of the vector packet has been reached. If not, the program branches back to step 940 to draw the next line segment in order. If the end of the vector packet has been reached, beam current is turned off at step 956 by activating the "BLANK" signal.

In the preferred embodiment, the stored values for the X and Y differential components of a vector define its slope and writing speed. The length of the vector is the product of the writing speed and the vector writing time, i.e. the time interval integrator switches 281 and 288 are closed for a particular vector. A writing time scaling factor may typically be associated with an entire vector packet digital representation, and adjusted in accordance with game parameters to determine an object's size. While it would of course be possible to store scale factors in ROM 140, with the differential component definitions, the scale factors will more typically be determined by the game logic in response to game conditions and provided to PIA chip 150 by the MPU. It is desirable to minimize writing time in order to maximize the number of objects which can be drawn in a given frame time. In the preferred embodiment, the minimum counting time for deflection from the CRT origin to the edge of the screen is approximately 64 microseconds, given the characteristics of the CRT yoke and deflection amplifiers.

To further illustrate the vector drawing technique of the present invention, reference is made to FIG. 11, where, inter alia, an object 01 is illustrated drawn in accordance with the novel technique. The origin of the CRT is the location at which the CRT beam would rest with no deflection fields applied. A positioning vector is moved from the CRT origin to the location at which the drawing of the object is to commence. This position vector is defined by the X and Y coordinates of that location, and the vector writing time. This information may be stored in ROM 140, or more typically generated by the game logic in dependence upon game conditions and events, e.g. a joystick command.

Once P1 has been moved, the vector packet comprising relative vectors V1–V6 is drawn. Typically, the vector packet defining an object will be stored in a "look-up" table located in program ROM 140. Each object may have an identifier defining the address locations of the associated table. Hence, the series of interconnected vectors defining an object are drawn serially as the respective vector definitions are retrieved serially from the program memory 140. The analog vector generation circuitry is operative to inherently draw the object as a series of connected line segments, since the integrators are not initialized during the drawing of an object; the end point of one line segment comprises the beginning point of the next line segment. The beam current may, of course, be turned off for a particular line segment or part thereof, as hereinabove described.

Figure 10:
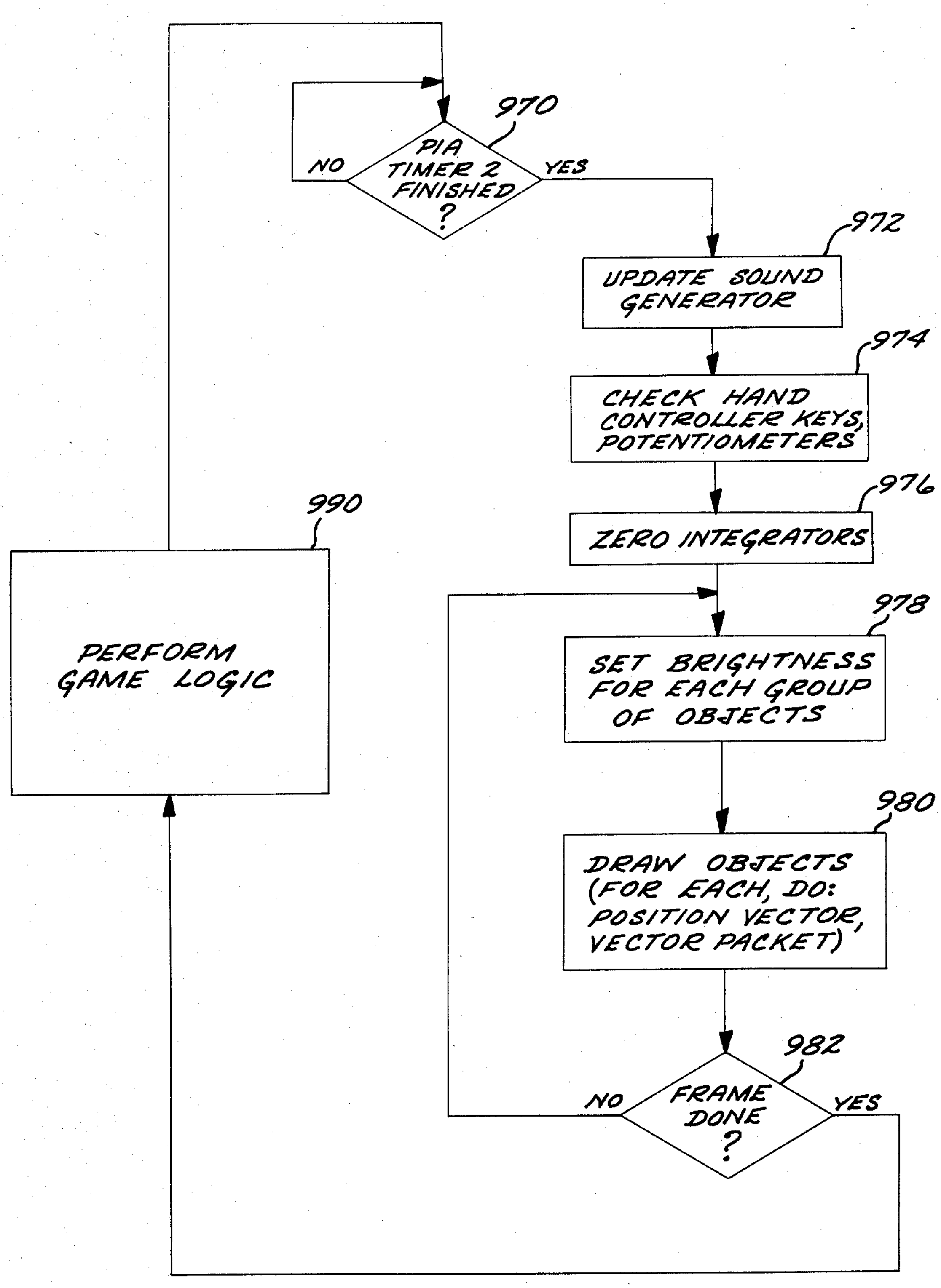
FIG. 10 is a logic flow diagram of an illustrative program for the play of a game utilizing the vector display system of the present invention.

The system of the present invention is well adapted to the video game application, simply by appropriate programming of the MPU and associated memories, and provision of appropriate game logic and object definition information. A very basic program organization for the playing of a game is shown in FIG. 10.

The game logic is performed at omnibus step 990, where game status, object location and other overhead information are updated. At step 970, a decision is made to determine whether the frame refresh PIA timer 2 has timed out. If it has, signifying that it is time to refresh the display, then the sound generator is updated at step 972. At step 974, the hand controller key switches and joystick potentiometers are checked. Vector generation occurs at steps 976–982. The reference brightness level (cathode current) is set for the group of objects to be drawn, the positioning vector is moved to the location of the object to be drawn, according to where the game logic places the object for the time period of the display refresh in question. Each of the line segments, i.e. the vector packet, comprising this object is drawn, as described above. At step 982, a decision is made to determine whether the frame has been completed. If all objects to be drawn on the frame have been completed, the program branches to step 990.

While the details of programming the MPU and the memories are not essential to the invention, a program support manual entitled "Mini-Arcade Executive Support Manual" has been prepared in connection with ongoing programming efforts for production equipment embodying the present invention, as well as a program listing for the MC6809 microprocessor assembler with rought flowcharts of certain subroutines. Copies of information in this documentation are submitted with the application as illustrative of programs which may be readily developed by persons skilled in the art to operate the present apparatus. Such information illustrates alternative vector packet formats and possible programming techniques (e.g. establishing two main process or functions, a stroke process or function and a game processor function very useful for implementation with a single microprocessor).

The type and number of arcade games for which the apparatus may be programmed are virtually limitless. It is further contemplated that additional peripheral equipment may easily be added to the present system. For example, the cartridge ROM could contain a BASIC language interpreter (or other high level language interpreter), one hand controller replaced by an alphanumeric keyboard, and the other hand controller replaced by a cassette interface to configure the system to write, create and run BASIC programs, e.g. as a mini-computer. Another contemplated peripheral device is a light pen (replacing one hand controller) for drawing vectors, menu selection, and the like. Other types of hand controllers may readily be used with the system. The system is very versatile because power supply voltage is supplied to the hand control connectors.

Translucent overlay 5 (FIG. 1) is provided to overlay the CRT screen, and provide game indicia tailored to a particular video game being displayed. The overlay 5 is tinted, so that, in a black/white CRT, the objects drawn appear to be the color of the overlay. An overlay 6 may also be provided to fit the hand controller units, as shown in FIG. 1, and provide game function indicia to the control switches.

External cartridge 25 (FIG. 1) includes ROM 62 which, as described above, may be used to provide supplemental game information. Preferably the shape of the cartridge 25 and the recess 27 in housing 10 are chosen and matched in a manner (e.g. as shown) to prevent cartridges used in other video games to be inserted and potentially damage the unit.

There has been described hereinabove a system adapted for object-oriented video display. An important aspect of the present invention is the relative simplicity of components, made possible by the recognition that arcade games are object oriented and have considerable redundancy in the information being displayed. The present system capitalizes on this redundancy by drawing objects consisting of connected line segments. This greatly reduces the complexity of the system, over the prior art systems directed to drawing independent line segments. This is a very powerful technique which allows visual displays of a quality and resolution not heretofore available in a self-contained low cost system. Reduction in component complexity has been achieved, resulting in a considerable advance over the prior art video games adapted for home use.

The present apparatus proves a powerful control over the characteristics of the CRT beam, i.e. its writing speed, direction, position and intensity. The ability for such extensive control over the beam allows the apparatus to function in a hybrid vector-pseudo raster scan format, wherein a localized raster scan field is provided in conjunction with a vector scan field. The system can even be used to provide a full raster-scan field.

What is claimed is:

1. Apparatus for drawing vectors on a CRT display, comprising:

digital-to-analog converter (DAC) means having an output;

first storing means having an input and an output for sampling a signal presented to said input and holding the sample as said output;

a second storing means having a second input and a second output; p1 first integrator means including a first differential amplifier means having a first input and a second input, the second input being connected to the output of said second storing means;

a second integrator means including a second differential amplifier means having a first input and a second input, the second input being connected to the output of said second storing means;

first switch means responsive to a first control signal to selectively couple the output of the first storing means to said first integrator means;

second switch means responsive to a second control signal to selectively couple the DAC output to said second integrator means;

a selector means responsive to at least a third control signal for selectively coupling the analog output of said DAC means to the input of said first storing means or to the input of said second storing means;

control means for supplying said first, second and at least a third control signal to control the operation of said DAC means, said selector means and said first and second switch means, said control means being operative to cause said first switch means to close for a predetermined time after said first storing means has stored an output of the DAC means and to cause said selector means to couple said DAC output to said second storing means only when said DAC is at a zeroing point; and deflection circuit means for coupling said integrator outputs to first and second CRT deflection coils for causing the CRT to deflect in accordance with the integrator output signals.

2. The apparatus of claim 1 wherein said DAC is arranged to operate in a two's complement function, and said second storage means is coupled to said DAC output only when the digital input to said DAC is zero.

* * * * *